US008041190B2

(12) United States Patent
Candelore et al.

(10) Patent No.: US 8,041,190 B2
(45) Date of Patent: Oct. 18, 2011

(54) SYSTEM AND METHOD FOR THE CREATION, SYNCHRONIZATION AND DELIVERY OF ALTERNATE CONTENT

(75) Inventors: Brant L. Candelore, San Diego, CA (US); Leo M. Pedlow, Jr., San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 930 days.

(21) Appl. No.: 11/292,256

(22) Filed: Dec. 1, 2005

(65) Prior Publication Data

US 2006/0130121 A1   Jun. 15, 2006

Related U.S. Application Data

(60) Provisional application No. 60/636,504, filed on Dec. 15, 2004, provisional application No. 60/637,305, filed on Dec. 16, 2004.

(51) Int. Cl.
*G11B 27/00* (2006.01)
*H04N 5/93* (2006.01)

(52) U.S. Cl. ........ 386/287; 725/115; 725/116; 725/145; 725/146

(58) Field of Classification Search .................... 386/52; 725/115, 116, 145, 146
See application file for complete search history.

(56) References Cited

U.S. PATENT DOCUMENTS

| | | |
|---|---|---|
| 3,852,519 A | 12/1974 | Court |
| 4,374,399 A | 2/1983 | Ensinger et al. |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |

(Continued)

FOREIGN PATENT DOCUMENTS

CA    2389247    5/2001

(Continued)

OTHER PUBLICATIONS

"Ad Agencies and Advertisers To Be Empowered with Targeted Ads Delivered by Television's Prevailing Video Servers", *Article Business Section of the New York Times*, Updated Thursday, Dec. 20, 2001.

(Continued)

*Primary Examiner* — Thai Tran
*Assistant Examiner* — Girumsew Wendmagegn
(74) *Attorney, Agent, or Firm* — Blakely, Sokoloff, Taylor & Zafman LLP

(57) ABSTRACT

According to one embodiment, A nonlinear editing system comprises a video encoder, an audio compressor and an engine unit. The engine unit is adapted to synchronize the video with the first alternate video and to synchronize the audio with the first alternate audio so that, where the scene of the program includes objectionable content, either (i) the video is substituted with the first alternate video, (ii) the audio is substituted with the first alternate audio, or (iii) both the video and the audio are substituted with the first alternate video and the first alternate audio.

18 Claims, 14 Drawing Sheets

U.S. PATENT DOCUMENTS

| | | |
|---|---|---|
| 4,722,003 A | 1/1988 | Kondo |
| 4,739,510 A | 4/1988 | Jeffers et al. |
| 4,772,947 A | 9/1988 | Kono |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,881,263 A | 11/1989 | Herbison et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson et al. |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,159,633 A | 10/1992 | Nakamura |
| 5,195,135 A | 3/1993 | Palmer |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski et al. |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams et al. |
| 5,455,862 A | 10/1995 | Hoskinson |
| 5,463,565 A | 10/1995 | Cookson et al. |
| 5,469,216 A | 11/1995 | Takahashi et al. |
| 5,471,501 A | 11/1995 | Parr et al. |
| 5,473,692 A | 12/1995 | Davis |
| 5,477,263 A | 12/1995 | O'Callaghan et al. |
| 5,481,296 A | 1/1996 | Cragun et al. |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,515,107 A | 5/1996 | Chiang et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,553,141 A | 9/1996 | Lowry et al. |
| 5,555,305 A | 9/1996 | Robinson et al. |
| 5,561,457 A | 10/1996 | Cragun et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,378 A | 2/1997 | Wasilewski |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,866 A | 5/1997 | Carrubba et al. |
| 5,629,981 A | 5/1997 | Nerlikar |
| 5,644,507 A | 7/1997 | Ostrover et al. |
| 5,652,615 A | 7/1997 | Bryant et al. |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,655 A | 12/1997 | Corey et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,185 A | 3/1998 | Hirayama |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith et al. |
| 5,757,417 A | 5/1998 | Aras et al. |
| 5,757,909 A | 5/1998 | Park |
| 5,761,180 A | 6/1998 | Murabayashi et al. |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,835,668 A | 11/1998 | Yanagihara |
| 5,838,873 A | 11/1998 | Blatter et al. |
| 5,850,218 A | 12/1998 | LaJoie et al. |
| 5,852,290 A | 12/1998 | Chaney |
| 5,852,470 A | 12/1998 | Kondo et al. |
| 5,859,662 A | 1/1999 | Cragun et al. |
| 5,870,474 A | 2/1999 | Wasilewski et al. |
| 5,892,900 A | 4/1999 | Ginter et al. |
| 5,894,320 A | 4/1999 | Vancelette |
| 5,894,516 A | 4/1999 | Brandenburg |
| 5,905,732 A | 5/1999 | Fimoff et al. |
| 5,914,719 A | 6/1999 | Herz et al. |
| 5,915,018 A | 6/1999 | Aucsmith |
| 5,917,830 A | 6/1999 | Chen et al. |
| 5,920,625 A | 7/1999 | Davies |
| 5,920,626 A | 7/1999 | Durden et al. |
| 5,922,048 A | 7/1999 | Emura |
| 5,923,755 A | 7/1999 | Birch |
| 5,930,361 A | 7/1999 | Hayashi et al. |
| 5,933,498 A | 8/1999 | Schneck et al. |
| 5,933,500 A | 8/1999 | Blatter et al. |
| 5,940,738 A | 8/1999 | Rao |
| 5,943,605 A | 8/1999 | Koepele, Jr. |
| 5,949,877 A | 9/1999 | Traw et al. |
| 5,949,881 A | 9/1999 | Davis et al. |
| 5,963,909 A | 10/1999 | Warren et al. |
| 5,973,679 A | 10/1999 | Abbott et al. |
| 5,973,722 A | 10/1999 | Wakai et al. |

| Patent | Kind | Date | Inventors |
|---|---|---|---|
| 5,973,726 | A | 10/1999 | Iijima et al. |
| 5,999,622 | A | 12/1999 | Yasukawa et al. |
| 5,999,698 | A | 12/1999 | Nakai et al. |
| 6,005,561 | A | 12/1999 | Hawkins et al. |
| 6,005,940 | A | 12/1999 | Kulinets |
| 6,011,849 | A | 1/2000 | Orrin |
| 6,012,144 | A | 1/2000 | Pickett |
| 6,016,348 | A | 1/2000 | Blatter et al. |
| 6,021,199 | A | 2/2000 | Isibashi |
| 6,021,201 | A | 2/2000 | Bakhle et al. |
| 6,026,164 | A | 2/2000 | Sakamoto et al. |
| 6,028,932 | A | 2/2000 | Park |
| 6,049,613 | A | 4/2000 | Jakobsson |
| 6,055,314 | A | 4/2000 | Spies et al. |
| 6,055,315 | A | 4/2000 | Doyle et al. |
| 6,057,832 | A | 5/2000 | Lev et al. |
| 6,057,872 | A | 5/2000 | Candelore |
| 6,058,186 | A | 5/2000 | Enari |
| 6,058,192 | A | 5/2000 | Guralnick et al. |
| 6,061,451 | A | 5/2000 | Muratani et al. |
| 6,061,471 | A * | 5/2000 | Coleman, Jr. .................. 382/173 |
| 6,064,676 | A | 5/2000 | Slattery et al. |
| 6,064,748 | A | 5/2000 | Hogan |
| 6,065,050 | A | 5/2000 | DeMoney |
| 6,069,647 | A | 5/2000 | Sullivan et al. |
| 6,070,245 | A | 5/2000 | Murphy, Jr. et al. |
| 6,072,872 | A | 6/2000 | Chang et al. |
| 6,072,873 | A | 6/2000 | Bewick |
| 6,073,122 | A | 6/2000 | Wool |
| 6,088,450 | A | 7/2000 | Davis et al. |
| 6,105,134 | A | 8/2000 | Pinder et al. |
| 6,108,422 | A | 8/2000 | Newby et al. |
| 6,115,057 | A | 9/2000 | Kwoh |
| 6,115,821 | A | 9/2000 | Newby et al. |
| 6,118,873 | A | 9/2000 | Lotspiech et al. |
| 6,134,237 | A | 10/2000 | Brailean et al. |
| 6,134,551 | A | 10/2000 | Aucsmith |
| 6,138,237 | A | 10/2000 | Ruben et al. |
| 6,148,082 | A | 11/2000 | Slattery et al. |
| 6,154,206 | A | 11/2000 | Ludtke |
| 6,157,719 | A | 12/2000 | Wasilewski et al. |
| 6,160,548 | A | 12/2000 | Lea et al. |
| 6,166,780 | A | 12/2000 | Bray |
| 6,170,075 | B1 | 1/2001 | Schuster et al. |
| 6,181,334 | B1 | 1/2001 | Freeman et al. |
| 6,181,364 | B1 | 1/2001 | Ford et al. |
| 6,185,369 | B1 | 2/2001 | Ko et al. |
| 6,185,546 | B1 | 2/2001 | Davis |
| 6,189,096 | B1 | 2/2001 | Haverty |
| 6,192,131 | B1 | 2/2001 | Geer, Jr. et al. |
| 6,199,053 | B1 | 3/2001 | Herbert et al. |
| 6,201,927 | B1 | 3/2001 | Comer et al. |
| 6,204,843 | B1 | 3/2001 | Freeman et al. |
| 6,209,098 | B1 | 3/2001 | Davis |
| 6,215,484 | B1 | 4/2001 | Freeman et al. |
| 6,216,263 | B1 | 4/2001 | Elam |
| 6,219,358 | B1 | 4/2001 | Pinder et al. |
| 6,222,924 | B1 | 4/2001 | Salomaki |
| 6,223,290 | B1 | 4/2001 | Larsen et al. |
| 6,226,385 | B1 | 5/2001 | Taguchi et al. |
| 6,226,618 | B1 | 5/2001 | Downs et al. |
| 6,229,576 | B1 | 5/2001 | Tarr et al. |
| 6,229,895 | B1 | 5/2001 | Son et al. |
| 6,230,194 | B1 | 5/2001 | Frailong et al. |
| 6,230,266 | B1 | 5/2001 | Perlman et al. |
| 6,236,727 | B1 | 5/2001 | Ciacelli et al. |
| 6,240,553 | B1 | 5/2001 | Son et al. |
| 6,246,720 | B1 | 6/2001 | Kutner et al. |
| 6,256,747 | B1 | 7/2001 | Inohara et al. |
| 6,263,506 | B1 | 7/2001 | Ezaki et al. |
| 6,266,416 | B1 | 7/2001 | Sigbjornsen et al. |
| 6,266,480 | B1 | 7/2001 | Ezaki et al. |
| 6,272,538 | B1 | 8/2001 | Holden et al. |
| 6,278,783 | B1 | 8/2001 | Kocher et al. |
| 6,289,455 | B1 | 9/2001 | Kocher et al. |
| 6,292,568 | B1 | 9/2001 | Akins et al. |
| 6,292,892 | B1 | 9/2001 | Davis |
| 6,307,939 | B1 | 10/2001 | Vigarie |
| 6,311,012 | B1 | 10/2001 | Cho et al. |
| 6,314,111 | B1 | 11/2001 | Nandikonda et al. |
| 6,314,409 | B2 | 11/2001 | Schneck et al. |
| 6,323,914 | B1 | 11/2001 | Linzer |
| 6,324,288 | B1 | 11/2001 | Hoffman |
| 6,327,421 | B1 | 12/2001 | Tiwari et al. |
| 6,337,947 | B1 * | 1/2002 | Porter et al. .................... 386/55 |
| 6,351,538 | B1 | 2/2002 | Uz |
| 6,351,813 | B1 | 2/2002 | Mooney et al. |
| 6,377,589 | B1 | 4/2002 | Knight et al. |
| 6,378,130 | B1 | 4/2002 | Adams |
| 6,389,533 | B1 | 5/2002 | Davis et al. |
| 6,389,537 | B1 | 5/2002 | Davis et al. |
| 6,415,031 | B1 | 7/2002 | Colligan et al. |
| 6,415,101 | B1 | 7/2002 | deCarmo et al. |
| 6,418,169 | B1 | 7/2002 | Datari |
| 6,424,717 | B1 | 7/2002 | Pinder et al. |
| 6,430,361 | B2 | 8/2002 | Lee |
| 6,445,738 | B1 | 9/2002 | Zdepski et al. |
| 6,449,718 | B1 | 9/2002 | Rucklidge et al. |
| 6,452,923 | B1 | 9/2002 | Gerszberg et al. |
| 6,453,115 | B1 | 9/2002 | Boyle |
| 6,453,116 | B1 | 9/2002 | Ando et al. |
| 6,456,985 | B1 | 9/2002 | Ohtsuka |
| 6,459,427 | B1 | 10/2002 | Mao et al. |
| 6,460,018 | B1 | 10/2002 | Kasai et al. |
| 6,463,445 | B1 | 10/2002 | Suzuki et al. |
| 6,466,671 | B1 | 10/2002 | Maillard et al. |
| 6,469,749 | B1 | 10/2002 | Dimitrova |
| 6,473,459 | B1 | 10/2002 | Sugano et al. |
| 6,480,551 | B1 | 11/2002 | Ohishi et al. |
| 6,490,728 | B1 | 12/2002 | Kitazato |
| 6,505,032 | B1 | 1/2003 | McCorkle et al. |
| 6,505,299 | B1 | 1/2003 | Zeng et al. |
| 6,510,554 | B1 | 1/2003 | Gordon et al. |
| 6,519,693 | B1 | 2/2003 | Debey |
| 6,526,144 | B2 | 2/2003 | Markandey et al. |
| 6,529,526 | B1 | 3/2003 | Schneidewend |
| 6,543,053 | B1 | 4/2003 | Li et al. |
| 6,549,229 | B1 | 4/2003 | Kirby et al. |
| 6,550,008 | B1 | 4/2003 | Zhang et al. |
| 6,557,031 | B1 | 4/2003 | Mimura et al. |
| 6,587,561 | B1 | 7/2003 | Sered et al. |
| 6,590,979 | B1 | 7/2003 | Ryan |
| 6,621,866 | B1 | 9/2003 | Florencio et al. |
| 6,621,979 | B1 | 9/2003 | Eerenberg et al. |
| 6,640,145 | B2 | 10/2003 | Hoffberg et al. |
| 6,640,305 | B2 | 10/2003 | Kocher et al. |
| 6,643,298 | B1 | 11/2003 | Brunheroto et al. |
| 6,650,754 | B2 | 11/2003 | Akiyama et al. |
| 6,654,389 | B1 | 11/2003 | Brunheroto et al. |
| 6,678,740 | B1 | 1/2004 | Rakib et al. |
| 6,681,326 | B2 | 1/2004 | Son et al. |
| 6,684,250 | B2 | 1/2004 | Anderson et al. |
| 6,697,489 | B1 | 2/2004 | Candelore |
| 6,697,944 | B1 | 2/2004 | Jones et al. |
| 6,701,258 | B2 | 3/2004 | Kramb et al. |
| 6,704,733 | B2 | 3/2004 | Clark et al. |
| 6,707,696 | B1 | 3/2004 | Turner et al. |
| 6,714,650 | B1 | 3/2004 | Maillard et al. |
| 6,741,795 | B1 | 5/2004 | Takehiko et al. |
| 6,754,276 | B1 | 6/2004 | Harumoto et al. |
| 6,771,285 | B1 | 8/2004 | McGrath et al. |
| 6,772,340 | B1 | 8/2004 | Peinado et al. |
| 6,788,690 | B2 | 9/2004 | Harri |
| 6,788,882 | B1 | 9/2004 | Geer et al. |
| 6,826,185 | B1 | 11/2004 | Montanaro et al. |
| 6,853,728 | B1 | 2/2005 | Kahn et al. |
| 6,867,818 | B2 | 3/2005 | Bray |
| 6,883,050 | B1 | 4/2005 | Safadi |
| 6,891,565 | B1 | 5/2005 | Dieterich |
| 6,895,128 | B2 | 5/2005 | Bohnenkamp |
| 6,898,799 | B1 | 5/2005 | Jarman |
| 6,899,383 | B2 | 5/2005 | Hwang |
| 6,904,520 | B1 | 6/2005 | Rosset et al. |
| 6,917,684 | B1 | 7/2005 | Tatebayashi et al. |
| 6,925,180 | B2 | 8/2005 | Iwamura |
| 6,938,162 | B1 | 8/2005 | Nagai et al. |
| 6,972,802 | B2 | 12/2005 | Bray |
| 6,973,187 | B2 | 12/2005 | Gligor et al. |

| Patent/Pub No. | Date | Inventor |
|---|---|---|
| 6,976,166 B2 | 12/2005 | Herley et al. |
| 6,976,265 B1 | 12/2005 | Yang et al. |
| 6,988,238 B1 | 1/2006 | Kovacevic et al. |
| 7,023,924 B1 | 4/2006 | Keller et al. |
| 7,039,802 B1 | 5/2006 | Eskicioglu et al. |
| 7,039,938 B2 | 5/2006 | Candelore |
| 7,054,547 B1 | 5/2006 | Abecassis |
| 7,055,166 B1 | 5/2006 | Logan et al. |
| 7,065,213 B2 | 6/2006 | Pinder |
| 7,079,752 B1 | 7/2006 | Leyendecker |
| 7,089,579 B1 | 8/2006 | Mao et al. |
| 7,096,481 B1 | 8/2006 | Forecast et al. |
| 7,096,487 B1 | 8/2006 | Gordon et al. |
| 7,110,659 B2 | 9/2006 | Fujie et al. |
| 7,120,250 B2 | 10/2006 | Candelore |
| 7,124,303 B2 | 10/2006 | Candelore et al. |
| 7,127,619 B2 | 10/2006 | Unger et al. |
| 7,139,031 B1 | 11/2006 | Bray |
| 7,139,398 B2 | 11/2006 | Candelore et al. |
| 7,146,007 B1 | 12/2006 | Maruo et al. |
| 7,151,831 B2 | 12/2006 | Candelore et al. |
| 7,151,833 B2 | 12/2006 | Candelore et al. |
| 7,155,012 B2 | 12/2006 | Candelore et al. |
| 7,158,185 B2 | 1/2007 | Gastaldi |
| 7,194,758 B1 | 3/2007 | Waki et al. |
| 7,221,706 B2 | 5/2007 | Zhao et al. |
| 7,292,692 B2 | 11/2007 | Bonan et al. |
| 7,298,959 B1 | 11/2007 | Hallberg et al. |
| 7,336,785 B1 | 2/2008 | Lu et al. |
| 7,360,234 B2 | 4/2008 | Robson et al. |
| 7,391,866 B2 | 6/2008 | Fukami et al. |
| 7,421,729 B2 | 9/2008 | Zenoni |
| 7,490,236 B2 | 2/2009 | Wasilewski |
| 7,490,344 B2 | 2/2009 | Haberman et al. |
| 7,496,198 B2 | 2/2009 | Pinder |
| 7,508,454 B1 | 3/2009 | Vantalon et al. |
| 7,555,123 B2 | 6/2009 | Pinder et al. |
| 2001/0013123 A1 | 8/2001 | Freeman et al. |
| 2001/0017885 A1 | 8/2001 | Asai et al. |
| 2001/0024471 A1 | 9/2001 | Bordes et al. |
| 2001/0030959 A1 | 10/2001 | Ozawa et al. |
| 2001/0036271 A1 | 11/2001 | Javed |
| 2001/0051007 A1 | 12/2001 | Teshima |
| 2002/0003881 A1 | 1/2002 | Reitmeier et al. |
| 2002/0021805 A1 | 2/2002 | Schumann et al. |
| 2002/0023013 A1 | 2/2002 | Hughes et al. |
| 2002/0026478 A1 | 2/2002 | Rodgers et al. |
| 2002/0026587 A1 | 2/2002 | Talstra et al. |
| 2002/0036717 A1 | 3/2002 | Abiko et al. |
| 2002/0044558 A1 | 4/2002 | Gobbi et al. |
| 2002/0046406 A1 | 4/2002 | Chelehmal et al. |
| 2002/0047915 A1 | 4/2002 | Misu |
| 2002/0056093 A1 | 5/2002 | Kunkel et al. |
| 2002/0059425 A1 | 5/2002 | Belfiore et al. |
| 2002/0065678 A1* | 5/2002 | Peliotis et al. ............ 705/1 |
| 2002/0066101 A1 | 5/2002 | Gordon et al. |
| 2002/0067436 A1 | 6/2002 | Shirahama et al. |
| 2002/0083317 A1 | 6/2002 | Ohta et al. |
| 2002/0083438 A1 | 6/2002 | So et al. |
| 2002/0083439 A1 | 6/2002 | Eldering |
| 2002/0097322 A1 | 7/2002 | Monroe et al. |
| 2002/0100054 A1 | 7/2002 | Feinberg et al. |
| 2002/0108035 A1 | 8/2002 | Herley et al. |
| 2002/0109707 A1 | 8/2002 | Lao et al. |
| 2002/0116705 A1 | 8/2002 | Perlman et al. |
| 2002/0122136 A1 | 9/2002 | Safadi et al. |
| 2002/0126890 A1 | 9/2002 | Katayama et al. |
| 2002/0129243 A1 | 9/2002 | Nanjundiah |
| 2002/0144116 A1 | 10/2002 | Giobbi |
| 2002/0144260 A1 | 10/2002 | Devara |
| 2002/0147782 A1 | 10/2002 | Dimitrova et al. |
| 2002/0150239 A1 | 10/2002 | Carny et al. |
| 2002/0157115 A1 | 10/2002 | Lu |
| 2002/0157116 A1 | 10/2002 | Jasinschi |
| 2002/0164022 A1 | 11/2002 | Strasser et al. |
| 2002/0170053 A1 | 11/2002 | Peterka et al. |
| 2002/0184506 A1 | 12/2002 | Perlman |
| 2002/0188567 A1 | 12/2002 | Candelore |
| 2002/0194589 A1 | 12/2002 | Cristofalo et al. |
| 2002/0194613 A1 | 12/2002 | Unger |
| 2002/0194619 A1 | 12/2002 | Chang et al. |
| 2002/0196939 A1 | 12/2002 | Unger et al. |
| 2002/0199208 A1 | 12/2002 | Chang et al. |
| 2003/0002854 A1 | 1/2003 | Belknap et al. |
| 2003/0009669 A1 | 1/2003 | White et al. |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0026523 A1 | 2/2003 | Chua et al. |
| 2003/0028879 A1 | 2/2003 | Gordon et al. |
| 2003/0034997 A1* | 2/2003 | McKain et al. ............ 345/723 |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Iuoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0105679 A1 | 6/2003 | Krishnan et al. |
| 2003/0108199 A1 | 6/2003 | Pinder et al. |
| 2003/0112333 A1 | 6/2003 | Chen et al. |
| 2003/0118059 A1* | 6/2003 | Sugahara ............ 370/535 |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152232 A1 | 8/2003 | Pirila et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0163832 A1 | 8/2003 | Tsuria et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto |
| 2003/0190054 A1 | 10/2003 | Troyansky et al. |
| 2003/0193973 A1 | 10/2003 | Takashimizu et al. |
| 2003/0194211 A1 | 10/2003 | Abecassis |
| 2003/0198223 A1 | 10/2003 | Mack et al. |
| 2003/0204717 A1 | 10/2003 | Kuehnel |
| 2003/0206631 A1 | 11/2003 | Candelore |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu et al. |
| 2004/0037421 A1 | 2/2004 | Truman |
| 2004/0039648 A1 | 2/2004 | Candelore et al. |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0049708 A1 | 3/2004 | Thomas et al. |
| 2004/0049780 A1 | 3/2004 | Gee |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0083177 A1 | 4/2004 | Chen et al. |
| 2004/0083484 A1 | 4/2004 | Ryal |
| 2004/0086127 A1 | 5/2004 | Candelore |
| 2004/0088552 A1 | 5/2004 | Candelore |
| 2004/0088558 A1 | 5/2004 | Candelore et al. |

| | | | | | | |
|---|---|---|---|---|---|---|
| 2004/0091109 A1 | 5/2004 | Son et al. | | EP | 0720374 | 7/1996 |
| 2004/0091239 A1 | 5/2004 | Poslinski et al. | | EP | 0382764 | 4/1997 |
| 2004/0100510 A1 | 5/2004 | Milic-Frayling et al. | | EP | 0833517 | 4/1998 |
| 2004/0123094 A1 | 6/2004 | Sprunk | | EP | 0866615 | 9/1998 |
| 2004/0136532 A1 | 7/2004 | Pinder et al. | | EP | 0926894 | 6/1999 |
| 2004/0139337 A1 | 7/2004 | Pinder et al. | | EP | 1187483 | 3/2002 |
| 2004/0151314 A1 | 8/2004 | Candelore | | JP | 61-264371 | 11/1986 |
| 2004/0158721 A1 | 8/2004 | Candelore | | JP | 2000125260 | 11/1986 |
| 2004/0165586 A1 | 8/2004 | Read et al. | | JP | 07046575 | 2/1995 |
| 2004/0168121 A1 | 8/2004 | Matz | | JP | 7067028 | 3/1995 |
| 2004/0172650 A1 | 9/2004 | Hawkins et al. | | JP | 10336624 | 12/1998 |
| 2004/0181666 A1 | 9/2004 | Candelore | | JP | 2001069480 | 3/2001 |
| 2004/0187161 A1 | 9/2004 | Cao | | JP | 2001117809 | 4/2001 |
| 2004/0189690 A1 | 9/2004 | Poslinski et al. | | JP | 2001242786 | 9/2001 |
| 2004/0193550 A1 | 9/2004 | Siegel | | JP | 11243534 | 10/2002 |
| 2004/0205812 A1 | 10/2004 | Candelore | | JP | 2003122710 | 4/2003 |
| 2004/0216169 A1 | 10/2004 | Fujiwara | | KR | 100299634 | 8/2008 |
| 2004/0240668 A1 | 12/2004 | Bonan et al. | | WO | WO-86/07224 | 12/1986 |
| 2004/0247122 A1 | 12/2004 | Hobrock et al. | | WO | WO-93/09525 | 5/1993 |
| 2004/0255321 A1 | 12/2004 | Matz | | WO | WO-94/10775 | 5/1994 |
| 2004/0261099 A1 | 12/2004 | Durden et al. | | WO | WO-94/13081 | 6/1994 |
| 2004/0264924 A1 | 12/2004 | Campisano et al. | | WO | WO-94/13107 | 6/1994 |
| 2004/0267602 A1 | 12/2004 | Gaydos et al. | | WO | WO-95/28058 | 10/1995 |
| 2005/0002385 A1 | 1/2005 | Candelore | | WO | WO-97/38530 | 10/1997 |
| 2005/0004875 A1 | 1/2005 | Kontio et al. | | WO | WO-9746009 | 12/1997 |
| 2005/0015816 A1 | 1/2005 | Christofalo et al. | | WO | WO-98/08341 | 2/1998 |
| 2005/0028193 A1 | 2/2005 | Candelore et al. | | WO | WO-00/31964 | 6/2000 |
| 2005/0036067 A1 | 2/2005 | Ryal et al. | | WO | WO-00/59203 | 10/2000 |
| 2005/0058291 A1 | 3/2005 | Candelore | | WO | WO-00/60846 | 10/2000 |
| 2005/0063541 A1 | 3/2005 | Candelore | | WO | WO-00/64164 | 10/2000 |
| 2005/0066357 A1* | 3/2005 | Ryal .............................. 725/35 | | WO | WO-0070817 | 11/2000 |
| 2005/0071669 A1 | 3/2005 | Medvinsky et al. | | WO | WO-01/26372 | 4/2001 |
| 2005/0071888 A1 | 3/2005 | Girouard et al. | | WO | WO-0135669 | 5/2001 |
| 2005/0094808 A1 | 5/2005 | Pedlow, Jr. et al. | | WO | WO-01/67667 | 9/2001 |
| 2005/0094809 A1 | 5/2005 | Pedlow, Jr. et al. | | WO | WO-0165762 | 9/2001 |
| 2005/0097596 A1 | 5/2005 | Pedlow, Jr. | | WO | WO-01/78386 | 10/2001 |
| 2005/0097597 A1 | 5/2005 | Pedlow, Jr. et al. | | WO | WO-02/51096 | 6/2002 |
| 2005/0097598 A1 | 5/2005 | Pedlow, Jr. et al. | | | | |
| 2005/0097614 A1 | 5/2005 | Pedlow, Jr. et al. | | | | |
| 2005/0102702 A1 | 5/2005 | Candelore et al. | | | | |
| 2005/0129233 A1 | 6/2005 | Pedlow, Jr. | | | | |
| 2005/0141713 A1 | 6/2005 | Genevois | | | | |
| 2005/0169473 A1 | 8/2005 | Candelore | | | | |
| 2005/0192904 A1 | 9/2005 | Candelore | | | | |
| 2005/0198586 A1 | 9/2005 | Sekiguchi et al. | | | | |
| 2005/0259813 A1 | 11/2005 | Wasilewski et al. | | | | |
| 2005/0265547 A1 | 12/2005 | Strasser et al. | | | | |
| 2005/0283797 A1 | 12/2005 | Eldering et al. | | | | |
| 2006/0064715 A1 | 3/2006 | Poslinski | | | | |
| 2006/0115083 A1 | 6/2006 | Candelore et al. | | | | |
| 2006/0130119 A1 | 6/2006 | Candelore | | | | |
| 2006/0130121 A1 | 6/2006 | Candelore et al. | | | | |
| 2006/0136976 A1 | 6/2006 | Coupe et al. | | | | |
| 2006/0153379 A1 | 7/2006 | Candelore et al. | | | | |
| 2006/0168616 A1 | 7/2006 | Candelore | | | | |
| 2006/0174264 A1 | 8/2006 | Candelore | | | | |
| 2006/0236220 A1 | 10/2006 | Jarman | | | | |
| 2006/0262219 A1 | 11/2006 | Molaro | | | | |
| 2006/0262926 A1 | 11/2006 | Candelore et al. | | | | |
| 2006/0269060 A1 | 11/2006 | Candelore et al. | | | | |
| 2007/0006253 A1 | 1/2007 | Pinder et al. | | | | |
| 2007/0091886 A1 | 4/2007 | Davis et al. | | | | |
| 2007/0118801 A1 | 5/2007 | Harshbarger et al. | | | | |
| 2007/0154176 A1 | 7/2007 | Elcock et al. | | | | |
| 2007/0186236 A1 | 8/2007 | Jarman | | | | |
| 2007/0288516 A1 | 12/2007 | Jarman | | | | |
| 2008/0130119 A1 | 6/2008 | Candelore et al. | | | | |
| 2009/0210698 A1 | 8/2009 | Candelore | | | | |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0696141 | 2/1996 |

OTHER PUBLICATIONS

"ClearPlay: The Technology of Choice", *from web site, Clearplay 2001-2003.*

"Dynamic-Customized TV Advertising Creation and Production Tools", *by SeaChange International, Web Site Literature.*

"How Networks Work—Millenium Edition", *Que Corporation*, (2000), pp. 88-89.

"McCormac Hack Over Cablemodem", *HackWatch* Aug. 10, 1998.

"Metro Media tm PVR-DVD-MP3-Web—Internet publication from www.metrolink.com, undated".

"Multimedia and Security Workshop at ACM Multimedia", '98. Bristol, U.K., (Sep. 1998).

"Passage tm, Freedom to Choose", *Sony Electronics Inc.*, (2003).

"Pre-Encryption Profiles—Concept Overview and Proposal", *Rev. 1.2 as submitted to the Open CAS consortium* on Dec. 28, 2000.

"Transport Streams Insertion of Video in the Compressed Digital Domain", *by SeaChange International, Web Site Literature*, 2000.

Anonymous, *Message Authentication with Partial Encryption, Research disclosure RD 296086*, (Dec. 10, 1998).

Anonymous, "New Digital Copy Protection Proposal Would Secure Authorized Copies", *PR Newswire*, (Nov. 1998), pp. 1-3.

Aravind, H. , et al., "Image and Video Coding Standards", *AT&T Technical Journal*, (Jan./Feb. 1993), pp. 67-68.

By Agi and Gong, "An Empirical Study of Secure MPEG Video Transmissions", *IEEE, Proceedings of SNDSS '96*, (1996), pp. 137-144.

By Alattar and Al-Regib, "Evaluation of Selective Encryption Techniques for Secure Transmission of MPEG-Compressed bit-Streams", *IEEE*, (1999), pp. IV-340 to IV-343.

By Alattar, Al-Regib & Al-Semari, "Improved Selective Encryption Techniques for Secure Transmission of MPEG Video Bit-Streams", *IEEE*, (1999), pp. 256-260.

By Gulwani, "A Report on Security Issues in Multimedia", *Course Notes, Department of Computer Science and Engineering, Indian Institute of Technology Kanpur*, (Apr. 30, 2000), pp. 10-14.

By Haberman, "Visible World—A High Impact Approach to Customized Television Advertising", (Dec. 2001).

By Koenen, et al., "The Long March to Interoperable Digital Rights Management", *IEEE*, (2004), pp. 1-17.

By Kunkelman, "Applying Encryption to Video Communication", *Multimedia and Security Workshop at ACM Multimedia '98*. Bristol, U.K., (Sep. 1998), pp. 41-47.

By Qiao and Nahrstedt, "Comparison of MPEG Encryption Algorithms", *Preprint submitted to Elsevier Science*, (Jan. 17, 1998).

By Rosenblatt, Bill, "Coral Consortium Aims to Make DRM Interoperable", *online at* www.drmwatch.com/standards/article.php/3418741, (Oct. 7, 2004).

By Shi and Bhargava, "An Efficient MPEG Video Encryption Algorithm", *1998 IEEE*, pp. 381-386.

By Spanos and Maples, "Performance Study of a Selective Encryption Scheme for the Security of Networked, Real-Time Video", *IEEE*, (1995), pp. 2-10.

By Wu and Kuo, "Fast Encryption Methods for Audiovisual Data Confidentiality", *SPIE International Symposia on Information Technologies 2000*, (Boston, Ma., USA), (Nov. 2000).

By Wu and Wu, "Run-Time Performance Evaluation for a Secure MPEG System Supporting Both Selective Watermarking and Encryption", *submitted to JSAC special issue on Copyright and Privacy Protection*, (Mar. 1, 1997).

By Wu and Wu, "Selective Encryption and Watermarking of MPEG Video (Extended Abstract)", *submitted to International Conference on Image Science, Systems, and Technology, CISST'97*, (Feb. 17, 1997).

By Zeng and Lei, "Efficient Frequency Domain Video Scrambling for Contest Access Control", *In Proc. ACM Multimedia*, (Nov. 1999).

Gonzalez, R.C., et al., "Digital Image Processing", *Addison Wesley Publishing Company, Inc.*, (1992), pp. 346-348.

Kim, et al., "Bit Rate Reduction Algorithm for a Digital VCR", *IEEE Transactions on Consumer Electronics*, vol. 37, No. 3, (Aug. 1, 1992), pp. 267-274.

Kondo, et al., "A New Concealment Method for Digital VCRs", *IEEE Visual Signal Processing and Communication*, Melbourne Australia, (Sep. 1993), pp. 20-22.

Kondo, et al., "Adaptive Dynamic Range Coding Scheme for Future Consumer Digital VTR", pp. 219-226.

Kondo, et al., "Adaptive Dynamic Range Coding Scheme for Future HDTV Digital VTR", *Sony Corporation*, (1991).

Kunkelmann, T., et al., "A Scalable Security Architecture for Multimedia Communication Standards", *Darmstard Univ. of Technology, ITO*, Germany, (1997), pp. 660-661.

Lakshimina, et al., "A Dual Protocol for Scalable Secure Multicasting", *1999 International Symposium on Computers and Communication*, (Jul. 1999), pp. 6-8.

Liu, et al., "Motion Vector Encryption in Multimedia Streaming", *IEEE*, (2004), pp. 64-71.

Lookabaugh, et al., "Selective Encryption and MPEG-2", *ACM Multimedia '03*, (Nov. 2003).

Menezes, Alfred J., et al., "Handbook of Applied Cryptography", *CRC Press*, pp. 551-553.

NHK Laboratories Note, "Error Correction, Concealment and Shuffling", No. 424, (Mar. 1994), pp. 29-44.

Park, et al., "A Simple Concealment for ATM Bursty Cell Loss", *IEEE Transactions on Consumer Electronics*, No. 3, (Aug. 1993), pp. 704-709.

Robert, et al., "Digital Cable: The Key to your Content", *Access Intelligence's Cable Group*, online at http:www.cableworld.com/ct/archives/0202/0202digitalrights.htm, (Feb. 2002).

Taylor, Jim, "DVD Demystified—The Guidebook for DVD-Video and DVD-ROM", *Pub. McGraw-Hill, ISBN: 0-07-064841-7*, (1998), pp. 134-147.

Tom, et al., "Packet Video for Cell Loss Protection Using Deinterleaving and Scrambling", *ICASSP 91: 1991 International Conference on Acoustics, Speech and Signal Processing*, vol. 4, (Apr. 1991), pp. 2857-2860.

Zhu, et al., "Coding and Cell-Loss Recovery in DCT-Based Packet Video", *IEEE Transactions on Circuits and Systems for Video Technology*, No. 3, NY, (Jun. 3, 1993).

Office Action dated Apr. 1, 2009 for U.S. Appl. No. 11/227,584.

Office Action dated May 11, 2011 for U.S. Appl. No. 11/227,584.

Office Action dated Oct. 1, 2010 for U.S. Appl. No. 11/227,584.

Office Action, Office Action dated Oct. 8, 2008 for U.S. Appl. No. 11/227,584.

Office Action, Office Action dated Jun. 23, 2009 for U.S. Appl. No. 11/344,292.

Office Action, Office Action dated Nov. 25, 2009 for U.S. Appl. No. 11/344,292.

Office Action, Office Action dated Jan. 6, 2010 for U.S. Appl. No. 11/363,716.

Office Action, Office Action dated Apr. 23, 2009 for U.S. Appl. No. 11/363,716.

Office Action, Office Action dated May 26, 2010 for U.S. Appl. No. 11/363,716.

Office Action, Office Action dated Nov. 10, 2010 for U.S. Appl. No. 11/363,716.

Office Action, Office Action dated Dec. 9, 2008 for U.S. Appl. No. 11/363,716.

Perry, et al., "Final report of the Co-Chairs of the Broadcast Protection Discussion Subgroup to the Copy Protection Technical Working Group", Jun. 3, 2003.

Anonymous—Functional Model of a Conditional Access System; EBU Project Group B/CA, EBU Review Technical, Winter No. 266, Grand Saconnex, CH; pp. 64-77; 1995.

"Automatic Generation of a Multimedia Encyclopedia from TV Programs by Using Closed Captions and Detecting Principal Video Objects", *NHK Sci. & Tech. Res. Labs*, Tokyo, Dec. 2006, pp. 873-880.

"Automatic News Video Segmentation and Categorization Based on Closed-Captioned Text", University of Illinois, Aug. 22-25, 2001, pp. 829-832.

Cheng, Howard, et al., "Partial Encryption of Compressed Images and Videos", *IEEE 2000*.

Cutts, David, "DVB Conditional Access", *Electronics and Communication Engineering Journal*, (Feb. 1997).

Kondo, et al., "Adaptive Dynamic Range Coding Scheme for Future Consumer Digital VTR", (1991), pp. 219-226.

Menezes, Alfred J., et al., "Handbook of Applied Cryptography", CRC Press, (2001), pp. 551-553.

Perkins, et al., "K-Time Encryption for K-Time Licensing", *IEEE*, (2002).

Teixeira, et al., "Secure Transmission of MPEG Video Sources", (1998).

Van Gassel, et al., "MPEG-2 Compliant Trick Play Over a Digital Interface", *IEEE*, (2002), 170-171.

Yip, Kun-Wah, "Partial-Encryption Technique for Intellectual Property Protection of FPGA-Based Products", *IEEE*, (Dec. 15, 1999), pp. 183-190.

Federman, Joel, Ph.D., "Rating Sex and Violence in the Media: Media Ratings and Proposals for Reform", A Kaiser Family Foundation Report, Nov. 2002, http://www.kff.org/entmedia/index.cfm.

U.S. Appl. No. 11/363,716, U.S. Patent & Trademark Office Action dated Jun. 7, 2011.

* cited by examiner

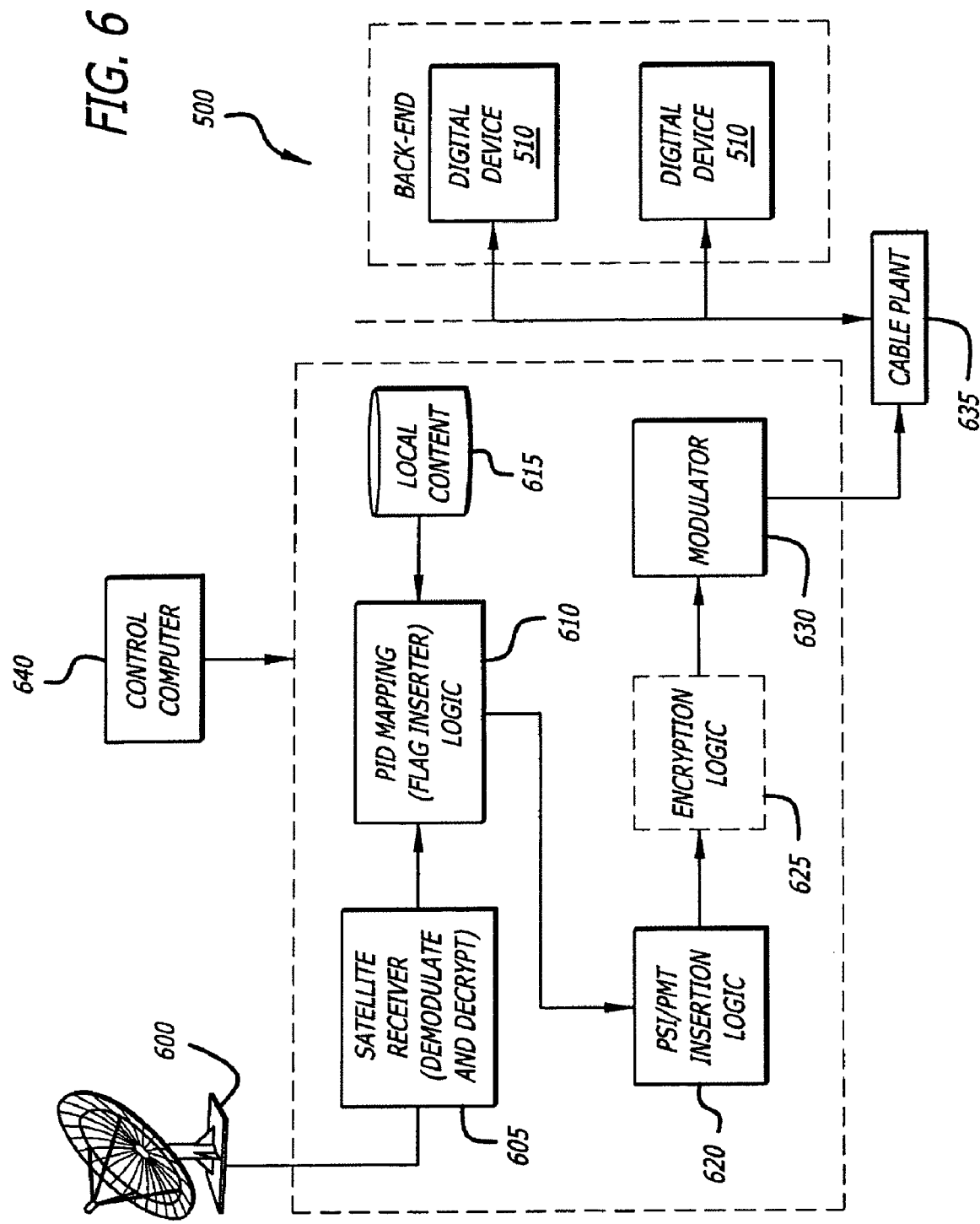

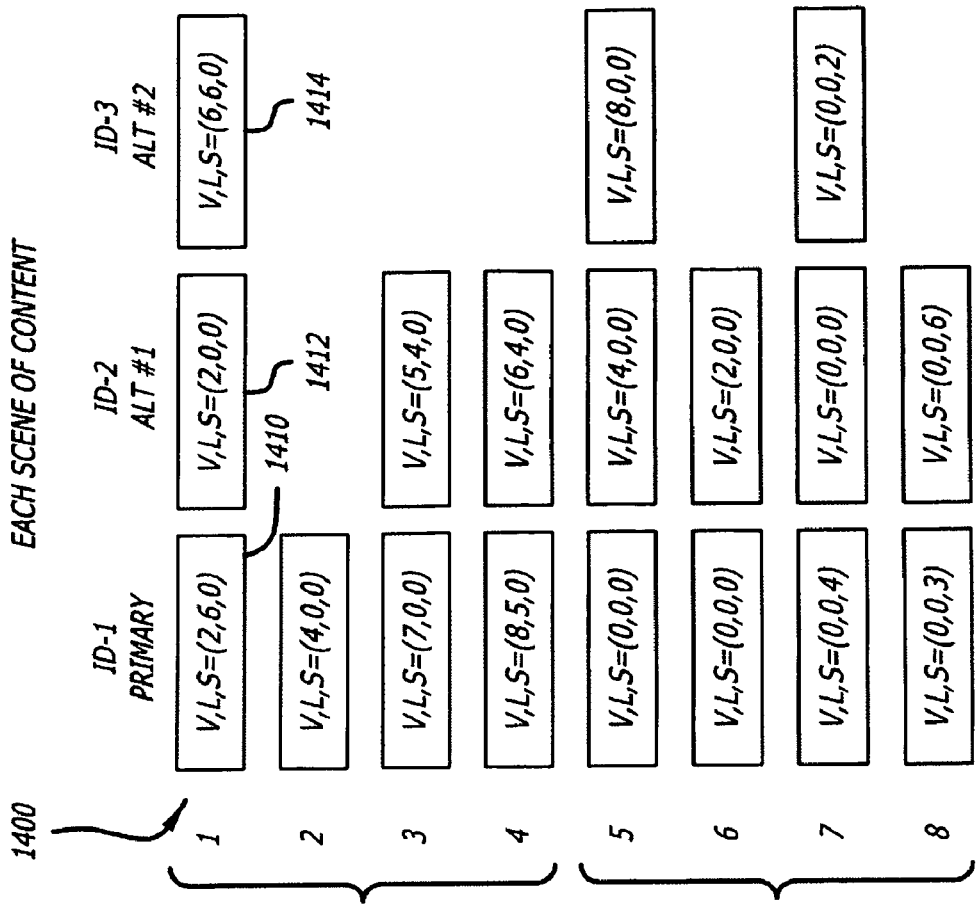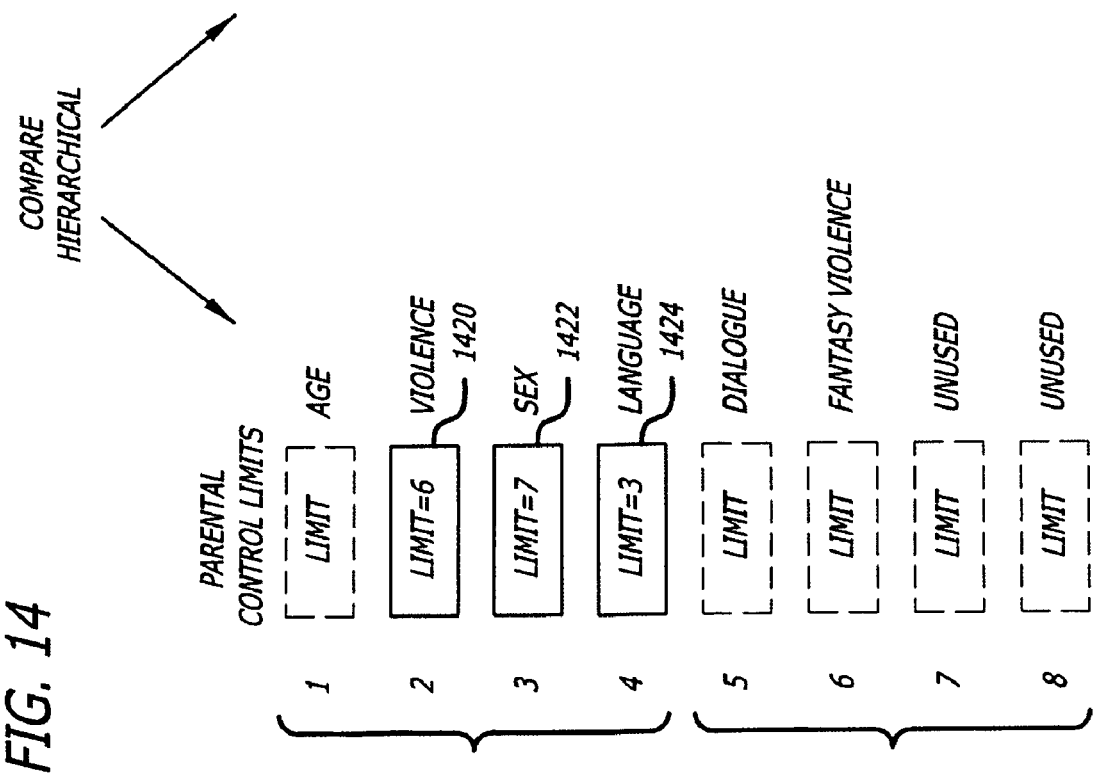
FIG. 14

SYSTEM AND METHOD FOR THE CREATION, SYNCHRONIZATION AND DELIVERY OF ALTERNATE CONTENT

CROSS-REFERENCE TO RELATED APPLICATIONS

This application claims the benefit of priority on U.S. Provisional Patent Application No. 60/636,504 filed Dec. 15, 2004 and U.S. Provisional Patent Application No. 60/637,305 filed Dec. 16, 2004, the contents of which are incorporated by reference.

BACKGROUND

1. Field

Embodiments of the invention relate to the field of digital content transmissions and display. More specifically, one embodiment of the invention relates to a system and method for creation, synchronization and delivery of alternate content for dynamic substitution of unwanted video or audio on a scene-by-scene basis.

2. General Background

Television is used to deliver content, such as entertainment and educational programs, to viewers. A growing number of parents are now watching and listening to content perceived by their children, in an effort to better shield their young children from exposure to objectionable content, namely violence, sexual situations, indecent or suggestive language and the like.

In television programming, for example, the removal/restoration of potentially objectionable content is implemented during content authoring/editing using a nonlinear editing system.

As illustrated in FIG. 1, a conventional nonlinear editing system 100 is used to select desired portions of audio and video sequences (scenes) taken from one or more libraries 110, which contain all of the raw content footage (e.g., video, audio, etc.) under consideration, and then to establish their temporal relationships. The temporal relationships involve the arrangement of adjacent sequences of the same content type.

For instance, as shown in FIG. 2, video sequences 202, 204, 206 and 208, namely uncompressed digital video 200, are arranged in a temporal relationship to each other. Audio sequences 212, 214, 216 and 218, namely audio 210, are similarly arranged with respect to each other. Thereafter, each video sequence 202, 204, 206 and 208 is synchronized with one or more audio sequences which may represent different forms of audio such as dialog tracks 212 and 214, music track 216, sound effects 218, or the like. Normally, the audio is in the form of Pulse Code Modulation (PCM) audio samples. Even though the end product consists of one continuous video sequence with a single synchronized audio track (containing a composition of multiple forms of audio accomplished by a digital mixdown unit 120 of FIG. 1), all digital components 200 and 210 comprising the content remain distinct and separate while in nonlinear editing system 100.

Referring back to FIG. 1, after the final edited version of the content is completed, it is then assembled into a compilation including the selected video and audio sequences. This involves the selected video and audio sequences being compressed, perhaps using MPEG-2 video encoder 130 and AC-3 audio compressor 140 for video and audio respectively, and synchronized with each other to produce a continuous transport stream 150 of a reduced size. This size reduction is what makes the transmission, broadcast and/or storage of digital video content practical, allowing it to fit on inexpensive media like DVDs or to be carried in standard six megahertz (6 MHz) Radio Frequency (RF) spectral channel concurrent with eight or more other A/V services.

After compression and placement into transport stream 150, the video and audio cannot be edited. Transport stream 150 features video running at a constant frame per second rate and compressed audio synchronized with the video. The audio is continuous as well, where silence is represented by specific data values. Conventional nonlinear editing system 100 offers no mechanism to produce any transport streams with alternate content that can be substituted for selected video and audio.

At the destination, with respect to the rendering of video programs, televisions have been implemented with technologies that allow parents to preclude the playback of programs that exceed a selected age-based rating. A black screen is shown for any program that exceeds the selected age-based rating in order to prevent such viewing. This program blocking can be disabled with a parental password.

However, there are a number of major shortcomings of these technologies. For instance, the filtering only occurs at the program level, namely a viewer gets to view the entire program or nothing at all. In other words, there is no selective blocking capability, and clearly no ability to substitute alternate content provided with the transport stream.

BRIEF DESCRIPTION OF THE DRAWINGS

Embodiments of the invention are illustrated by way of example and not by way of limitation in the figures of the accompanying drawings, in which like references indicate similar elements and in which:

FIG. 6 is an exemplary block diagram of a content delivery back-end consistent with certain embodiments of the invention.

FIG. 14 is an exemplary embodiment of a Content-based Rating scheme for modification or substitution of scenes including objectionable content.

DETAILED DESCRIPTION

Figure 1:
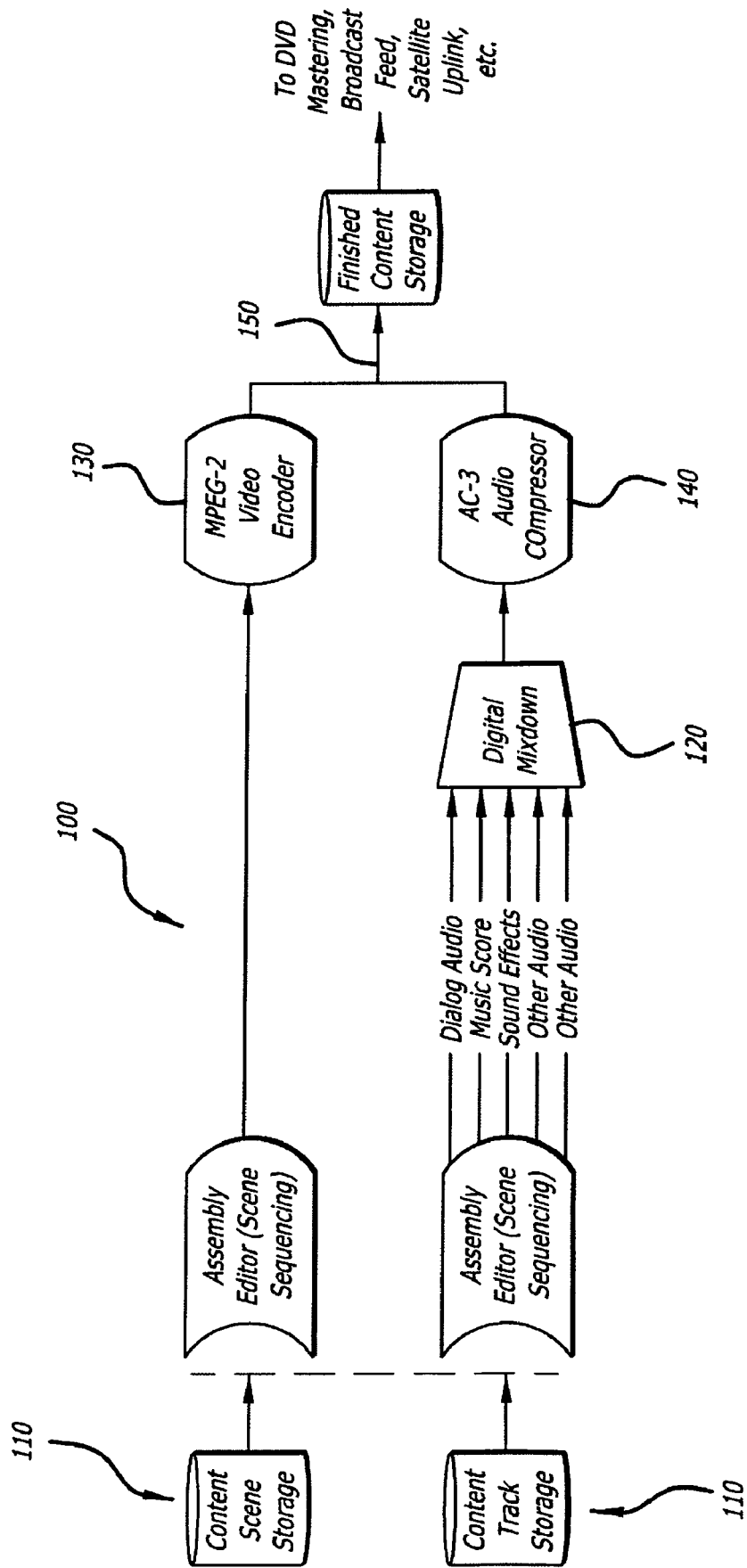
FIG. 1 is a block diagram of the operations of a conventional nonlinear editing system.
Figure 2:
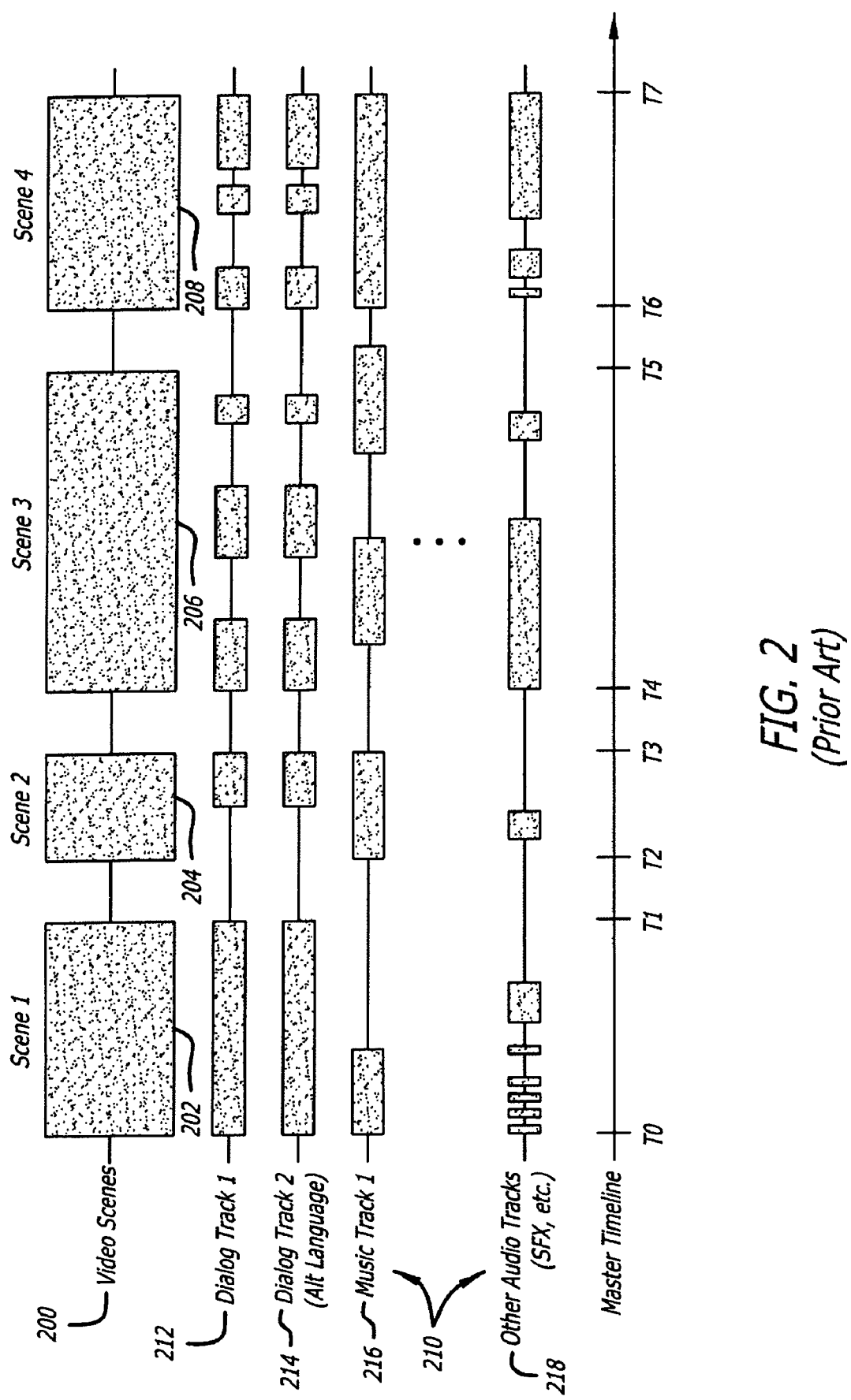
FIG. 2 is a block diagram of a display of content processed by the conventional nonlinear editing system.

Various embodiments of the invention relate to a system and method for creation, synchronization and delivery of alternate content for dynamic substitution of unwanted video or audio on a scene-by-scene basis. According to one embodiment of the invention, a nonlinear editing system supporting dynamic content replacement (hereinafter referred to as "dynamic nonlinear editing system") is implemented within the content delivery network. At a digital device, a content filter unit is implemented within the digital device and is configured to provide parental control by performing scene-by-scene evaluation of content associated with the incoming transport stream (e.g., video, images, audio or any combination thereof) and subsequent modification or elimination of objectionable content. Of course, the content filter unit may be implemented at the front-end in lieu of at the back-end that is described below in detail.

In short, the combination of the dynamic nonlinear editing system and the content filter unit provides scene-by-scene filtration, and even to the granularity of frame-by-frame, to block or replace individual scenes or words. Such blocking may be accomplished by the content filter unit residing with the customer through screen blocking or obscuring pixels for a particular image or muting audio. Alternatively, content within the scene can be replaced in order to reduce the rating of the program (referred to as "down-rating"), or may even be replaced to reinsert content that was previously obscured/removed in order for the programming to achieve the higher rating (referred to as "up-rating").

According to one embodiment of the invention, the replacement content is transmitted in the same digital transport stream as the primary content, and is synchronized with the primary content that it is replacing for swapping on-the-fly. Thus, the rendering of higher or lower rated content is accomplished, where programs can be created and broadcast with multiple versions having different content and ratings. Also, all content, including advertisements, news, sporting events and the like may be filtered as well in lieu of just movies and television shows.

For purposes of the present description, the term "digital device" may refer to consumer electronics that is adapted to tune, receive, decrypt, descramble and/or decode transmissions from any content provider. The "consumer electronics" may include, but is not limited or restricted to a television, a set-top box, a personal digital assistant (PDA), a computer, a cellular telephone, a video game console, a portable music player, a stereo system, a personal video recorder, or the like. Examples of "content providers" may include a terrestrial broadcaster, a cable or satellite television distribution system, or a company providing content for download over the Internet or other Internet Protocol (IP) based networks like an Internet service provider.

In the following description, certain terminology is used to describe features of the invention. For example, in certain situations, the terms "component," "unit" and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic.

An example of "software" includes executable code in the form of an application, an applet, a routine or even a series of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory, etc.), a floppy diskette, an optical disk (e.g., compact disk or digital video disc "DVD"), a hard drive disk, a tape, or the like.

In addition, the term "program" generally represents a stream of digital content that is configured for transmission to one or more digital devices for viewing and/or listening. For instance, the program may be configured as a transport stream. According to one embodiment, the program may contain multiple identifiers such as Packet Identifiers (PIDs) when the program is MPEG (Moving Pictures Expert Group) compliant compressed video. These multiple PIDs provide for replacement of one scene of content for another. The "scene" is defined as one or more frames of content, namely video, images, audio or any combination thereof. For instance, a scene may be one or more frames of video and/or audio, or even a packet of music downloaded into a portable music player.

More specifically, multiple PIDs may be associated with a single program in order to provide content replacement for this program. Content replacement provides an enhanced level of viewing/listening customization. For example, content replacement can be used to provide targeted advertising to an audience by the substitution of one advertisement determined to be "objectionable" for another. Content replacement can also be used to provide multiple scenes, endings or other segments for a program, or perhaps to provide multiple views in a sportscast or other program. Other applications for the content replacement of the invention fall within the spirit and scope of the invention.

Certain types of content, such as movies, have an associated content rating established by a supervisory body to inform potential viewers of the type of material that may form a part of the content. General ratings of G, PG, PG-13, R and NC-17 are commonly established for most movies produced in the United States by the Classification and Ratings Administration (CARA) of the Motion Picture Association (MPA) or the Motion Picture Association of America (MPAA). Television programming is similarly rated by the TV Parental Guidelines Monitoring Board, which provides ratings of TV-Y, TV-Y7, TV-Y7-FV, TV-G, TV-14 and TV-MA.

For purposes of this document, content having a rating provided under such rating systems will be referred to as having a "higher" rating if it is intended for more mature audiences, and a "lower" rating if it is intended for a more general or less mature audience. Hence, the previously described rating systems are listed from lowest to highest. Therefore, within this terminology, an R rating would be considered a "higher" rating than a G rating. Such nomenclature is defined herein for simplicity of description of the above rating system as well as equivalent systems, without intent for the nomenclature to pass any judgment on the quality of such content.

Additionally, the term "rating" is intended to embrace any suitable content rating system, domestic or foreign, public, private or even governmental that is formed to serve a similar function. Such rating information may be provided as data embedded within program specific information such as data inserted into an Adaptation field of a MPEG packet for example when the content is video.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described.

I. General Architecture of Content Delivery Front-End

In order to support dynamic content substitution, the authoring process associated with the dynamic nonlinear editing system is modified to allow concurrent editing of one or more alternate video tracks and additional audio tracks. Each of the alternate video tracks is subordinate to the primary video track and is temporally synchronized with it. After post-processing, these video tracks will be carried in the same transport stream, namely as part of the same program. The dynamic nonlinear editing system is extended to accommodate the additional tracks for alternate video and audio and is complementary to the editing paradigm established for this tool.

As described earlier, the "final cut" is assembled, mixed (audio) and streamed to compression equipment (encoders). A video encoder can only accept a single, continuous video stream. The primary video meets the criterion. The alternate video, however, is normally a non-continuous sequence of video that is transmitted concurrently with the primary video and, in some situations, used to replace the primary video or portions thereof.

Figure 3:
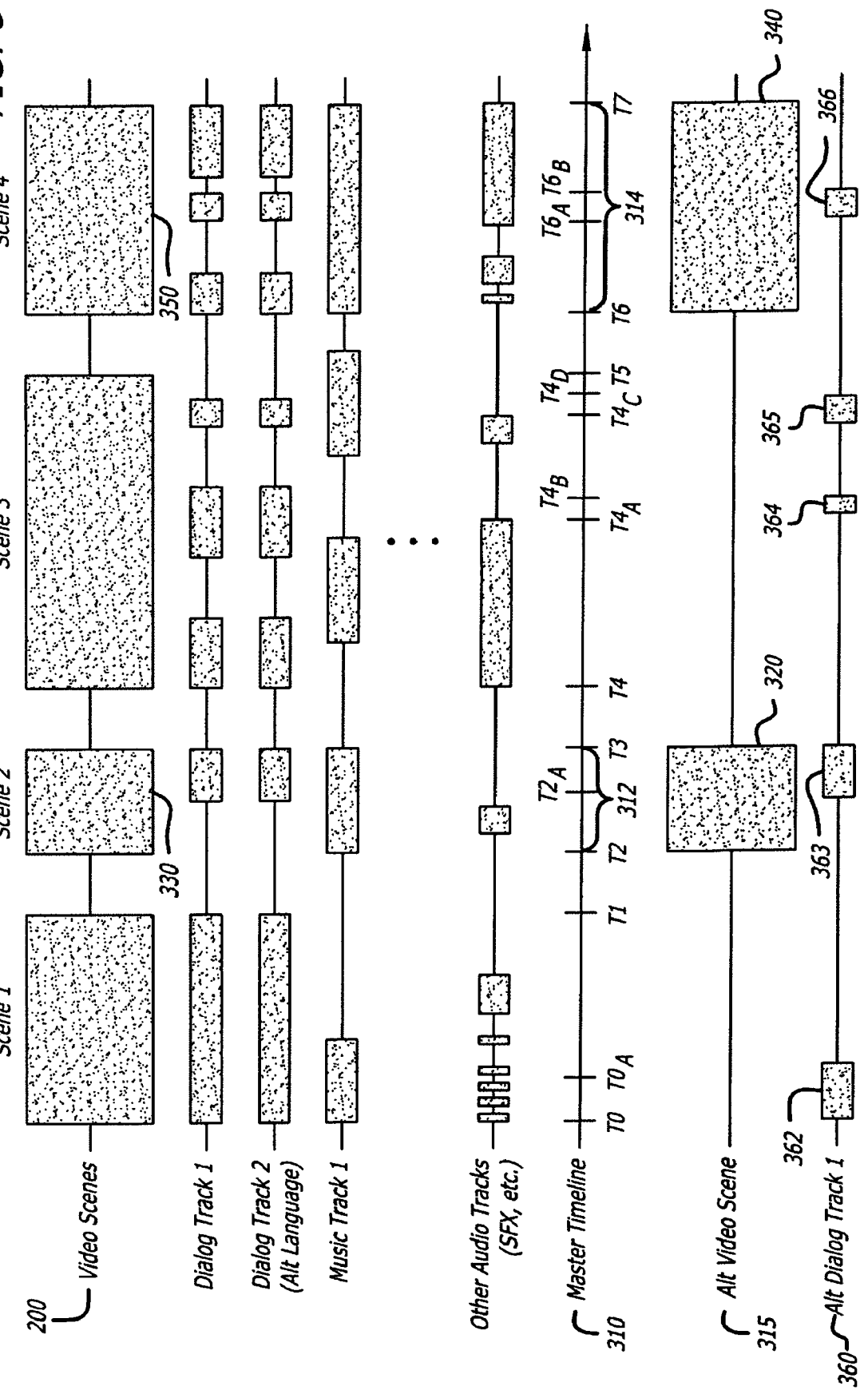
FIG. 3 is a block diagram of a display of content processed by a dynamic nonlinear editing system.

Referring to FIG. 3, a block diagram of a display of content processed by a dynamic nonlinear editing system being part of a content delivery front-end is shown. The dynamic nonlinear editing system 300 is modified to support synchronization and delivery of replacement content, such as alternate video 315 and/or audio tracks 360 for example.

As shown, alternate video 320 is provided during a first time period 312 (from T2 and T3) of a master timeline 310, which corresponds to the display duration of video scene 330. Also, alternate video 340 is provided during a second time period 314 (from T6 and T7) of master timeline 310, corresponding to the duration of video scene 350. The duration of first and second time periods 312 and 314 may constitute the display time for one or more frames of video (e.g. 15 frames of video constituting one-half second of display time, or perhaps more frames).

As further shown, alternate audio 360 includes multiple audio segments 362-366. A first alternate audio segment 362 occurs at the start of time T0 and ends at time $T0_A$ while a second alternate audio segment 363 occurs at time $T2_A$ and ends at time T3. Between time periods T4 and T5, a third and fourth alternate audio segments 364-365 are placed, namely between $T4_A$-$T4_B$ and $T4_C$-$T4_D$. Similarly, a fifth alternate audio segment 366 occurs at time $T6_A$ and ends at time $T6_B$. For this embodiment, first, fourth and fifth alternate audio segments 362, 365 and 366 constitute alternate dialog. Second audio segment 363 constitutes an alternate music track and third audio segment 364 constitutes an alternate special effects track.

Figure 4:
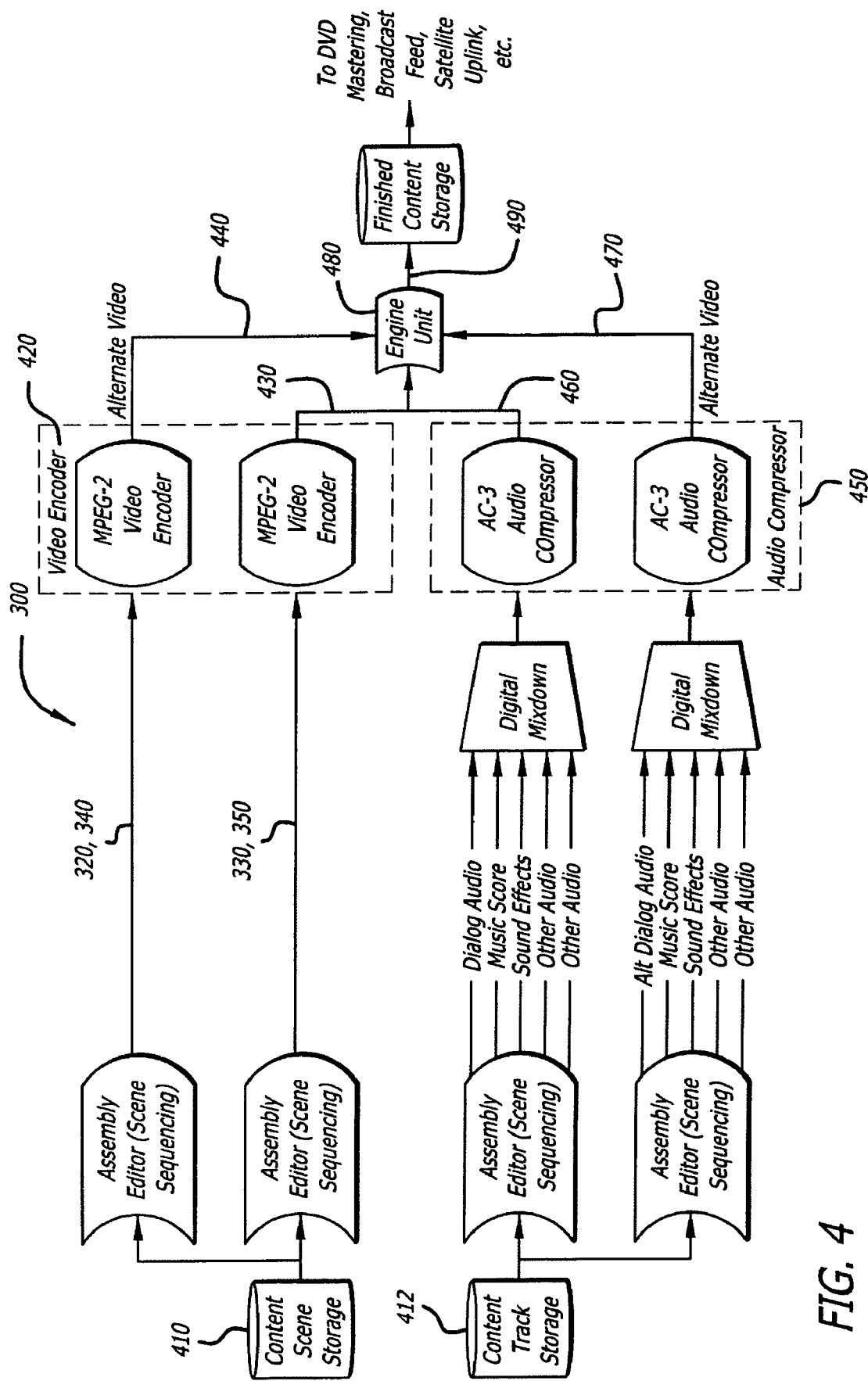
FIG. 4 is a block diagram of the operations of the dynamic nonlinear editing system developed in accordance with one embodiment of the invention.

Referring to FIG. 4, a block diagram of the operations of dynamic nonlinear editing system 300 developed in accordance with one embodiment of the invention is shown. Dynamic nonlinear editing system 300 receives information from content storage units 410 and 412, which are configured to store video and audio content. Dynamic nonlinear editing system 300 is adapted to sequence video and audio retrieved from content storage units 410 and 412, and then to establish their temporal relationships. The temporal relationships involve the arrangement of adjacent sequences of the same content type.

In order to remain compatible with video encoder 420, dynamic nonlinear editing system 300 fills the time periods before, after and between alternate video 320 and 340 with synchronized black screen in order to create a continuous video stream for processing by video encoder 420. It is contemplated that the encoding of the primary and alternate video will occur on the same encoder, and therefore, the two processes will occur serially. As a result, dynamic nonlinear editing system 300 will need to communicate with video encoder 420 so that synchronization information may be inserted by video encoder 420 into both resultant compressed video streams 430 and 440 for post-encoding reprocessing where video streams 430 and 440 are combined with proper synchronization.

Similarly, dynamic nonlinear editing system 300 fills the time periods before, after and between alternate audio segments 362-366 with muted audio in order to create a continuous audio stream, for processing by audio compressor 450. It is contemplated that the encoding of the primary and alternate audio may occur serially on the same audio compressor 450, or on multiple audio compressors. When using the same audio compressor 450 as shown, dynamic nonlinear editing system 300 will need to communicate with audio compressor 450 so that synchronization information may be inserted by audio compressor 450 into both resultant compressed audio streams 460 and 470 for post-encoding reprocessing.

A transport processing engine unit 480 receives video streams 430 and 440 and audio streams 460 and 470. Transport processing engine unit 480 conducts a trimming operation of alternate content as well as performs content synchronization, content re-multiplexing and meta data insertion. These operations are complementary with the functionality of device 510 of FIG. 5, and perhaps substantially similar where content replacement is conducted in the front end.

First, the alternate content contains blank video (black screen) and muted audio between alternate content segments. This is a byproduct of preparing the content for compression. Transport processing engine unit 480 trims all black screen content and muted audio purposefully added to create the continuous audio. This allows the alternate content to be multiplexed into the primary transport stream.

As an illustrative example, referring to FIG. 3, video scene 330 and alternate video 320 need to be processed to ensure that these video segments are temporally equivalent within the transport stream. In other words, these video segments need to be virtually identical in duration and aligned temporally where such editing occurs after being encoded/compressed and during placement within the transport stream. The same temporal alignment is required for video scene 350 and its alternate video 340.

Secondly, transport processing engine unit 480 uses synchronization marks inserted by video encoder 420 and audio compressor 450 to ensure that the digital device will display either the primary or alternate video at the same time. As an example, for MPEG transmissions, three synchronization elements are used for video: PCR (primary clock reference)—clocking at approximately 27 megahertz (MHz); DTS (decoding time stamp)—placed on video itself to start conversion from MPEG to analog video format; and PTS (presentation time stamp)—when picture should be displayed. Both primary video 330 and alternate video 320 should have the same synchronization marks.

Similar synchronization marks may be used for audio, and thus, the primary and alternative audio will have the same synchronization marks. This allows alternate content to be correctly located temporally within the transport stream so that primary/alternate video as well as the primary/secondary audio can be contextually located adjacent to each other.

Third, transport processing engine unit 480 merges the alternate content into the transport stream and inserts meta data as needed to enable suitably equipped playback devices, such as digital device as described below, to dynamically select any combination or primary/alternate content during broadcast or playback of the resultant composite content. As part of the merging process, the re-multiplexer corrects PCR synchronization marks and other tasks normally encountered and associated with the re-multiplexing process.

According to one embodiment, the meta data is inserted into an Adaptation field of one or more MPEG-based packets forming the transport stream. The meta data may provide Age-based rating information, content tag information or the like as described below.

The composite, homogeneous output 490 from transport processing engine unit 480 is then returned to the normal content process flow, where it is stored or forwarded to a distribution phase by a content provider as describe below.

II. General Architecture of Content Delivery Back-End

Figure 5:
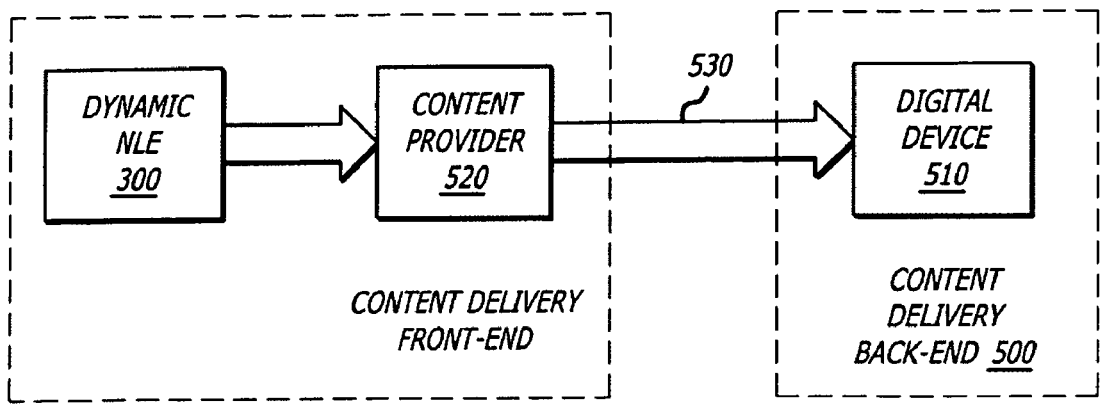
FIG. 5 is an exemplary block diagram of a content delivery network consistent with certain embodiments of the invention.

Referring to FIG. 5, an exemplary block diagram of a content delivery back-end 500 consistent with certain embodiments of the invention is shown. Content delivery back-end 500 comprises a digital device 510 that receives digital content such as a program from one or more content providers 520. The program may be propagated as a digital data stream for example in compliance with any data compression scheme. Examples of a data compression scheme include, but are not limited or restricted MPEG standards.

According to one embodiment of the invention, digital device 510 decodes an incoming program, and evaluates the content of the incoming program on a scene-by-scene basis to determine whether such scenes include any objectionable content. Such evaluation may involve a review of the rating assigned to each scene or perhaps access data within tags assigned to each scene to determine whether the scene includes any objectionable content. These evaluation schemes are described below.

Since digital device 510 may be adapted to increase or decrease the rating of the program, the term "objectionable content" has two meanings. One meaning is that it is content featuring certain subject matter that may be inappropriate for the viewing or listening audience at this time. Another meaning is that it is low-rated content that can be substituted for higher rated content due to the mature nature of the viewing or listening audience and their request for up-rating of content.

Content provider 520 provides the digital content to digital device 510 through transmission medium 530, which operates as a communication pathway for the program within the content delivery network. The transmission medium 530 may include, but is not limited to electrical wires, optical fiber, cable, a wireless link established by wireless signaling circuitry, or the like.

Content provider 520 may be adapted with a satellite antenna 600 to receive a multiplexed stream of content from a satellite transmission as shown in FIG. 6. The stream of content is received, demodulated and decrypted at a satellite receiver 605 before being routed to PID Mapping logic 610. The stream of content may include replacement content associated with secondary PIDs. Alternatively, the replacement content may be retrieved from a local content database 615 or other sources of content.

PID mapping logic 610 maps the incoming content from whatever source to a set of primary PIDs and a set of secondary PIDs. The incoming content includes (i) content originally intended for rendering (referred to as the "primary content") and (ii) substitution content for various scenes (referred to as "replacement content"). The primary content is associated with the primary PIDs and the replacement content is associated with the secondary PIDs. According to this embodiment, PID mapping logic 610 may also be adapted to insert flags (or markers) into the content in order to identify the location where replacement content is to be inserted.

The mapped content then is routed to PSI/PMT insertion logic 620 that inserts Program Specific Information (PSI) and Program Map Tables (PMT) into the content for use by the decoding side in decoding the programming. If the content is to be encrypted, it may optionally pass through encryption logic 625 prior to modulation at a modulator (e.g., a QAM modulator) 630. The modulated stream of content is then transmitted via transmission medium 530 to content delivery back-end 500, which features one or more digital device(s). For instance, the modulated stream of content may be routed to via a cable plant 635 to content delivery back-end 500. The operation performed by content provider 520, including but not limited to the PID mapping for content replacement, is carried out under control of a control computer 640.

In general, a system can be used to form a content substitution encoder consistent with certain embodiments of the invention in which input data inclusive of primary content and replacement content. PID mapping logic 610 assigns a primary PID to the primary content and assigns a secondary PID to the replacement content. Private data to identify the primary content by the primary PID and replacement content by the secondary PID, along with the primary content mapped to the primary PID and the replacement content mapped to the secondary PID, are assembled into a data stream.

Of course, it is contemplated that PID mapping logic 610 may be instructed to remap the PIDs to select only the desired content based on parental control parameters routed to content provider 520 from various digital devices. Hence, if utilized, secondary PIDs may be associated with previously substituted segments of primary content.

Figure 7:
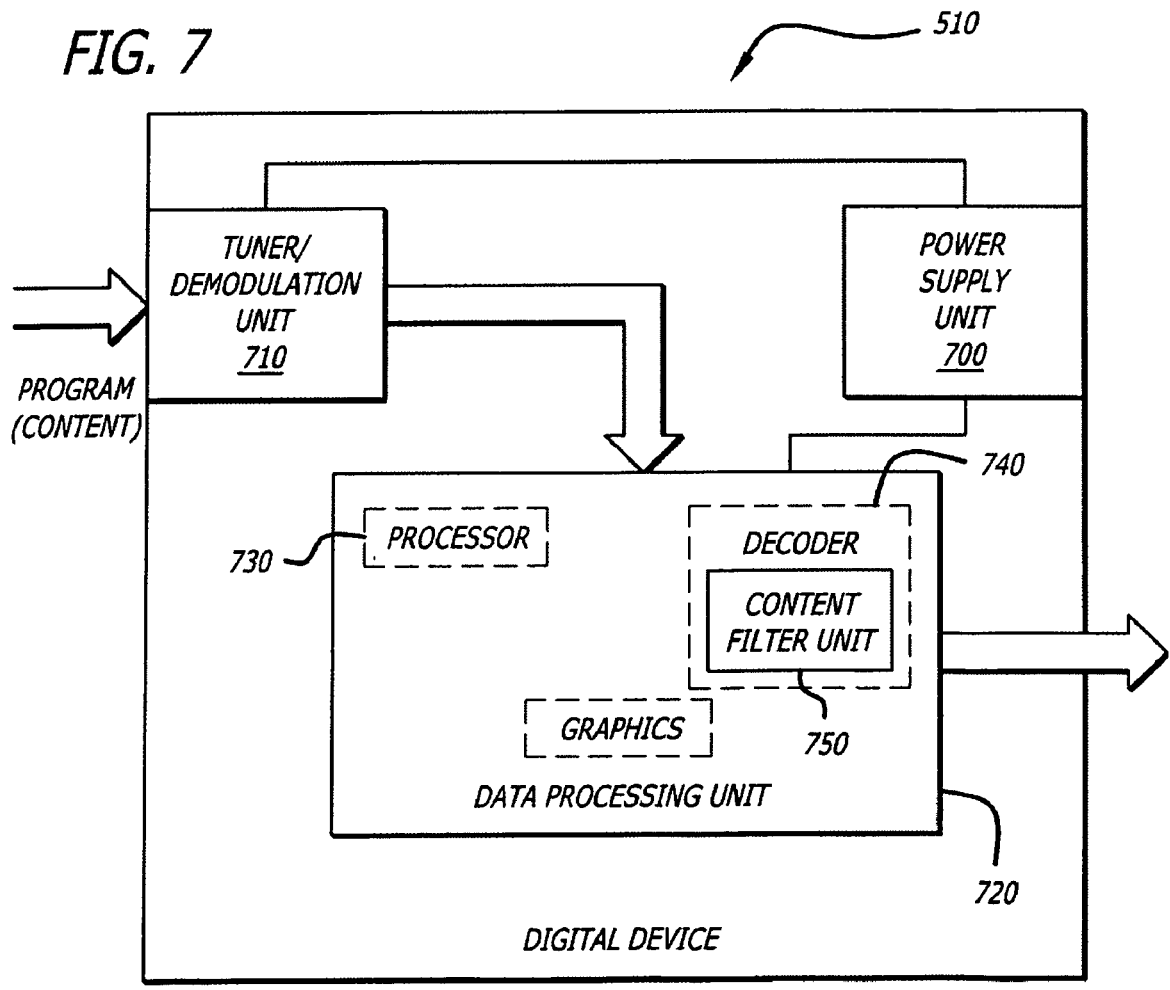
FIG. 7 is an exemplary diagram of a content filter unit implemented within a digital device of the content delivery system of FIG. 5.

Referring now to FIG. 7, an exemplary diagram of digital device 110 of the content delivery system 100 is shown. Digital device 110 comprises a power supply unit 700, a tuner/demodulation unit 710 and data processing unit 720. Power supply unit 700 is adapted to provide powered to tuner/demodulation unit 710 and data processing unit 720. Power supply unit 700 may provide regulated power based on input power received from a wall socket (e.g., 110 volts alternating current "VAC", 220 VAC, etc.). Tuner/demodulation unit 710 tunes to a channel to receive the program and demodulates an incoming program to recover the content. Then, the content is routed as a digital bit stream to data processing unit 720.

According to one embodiment of the invention, data processing unit 720 comprises a processor 730 (e.g., central processing unit) and/or a decoder 740. These components may be implemented as separate integrated circuits or as a single integrated circuit. As described herein, data processing unit 720 features logic operating to decode and process incoming information as well as a content filter unit 750 that is adapted to alternatively select replacement content during playback of video and/or audio.

In general, according to one embodiment of the invention, content filter unit 750 is designed to select alternate PID(s) from the digital bit stream based on findings by data processing unit 720, which accesses meta data in Adaptation fields within MPEG packets to obtain information for use in evaluating whether a scene has objectionable content.

According to one embodiment, data processing unit 720 is adapted to process the closed captioning and emergency alert system (EAS) data as well as guide data. In addition, data processing unit 720 may be adapted to access the meta data in Adaptation fields of MPEG packets in order to provide signaling to content filter unit 750 regarding the subject matter within each scene that is scheduled to be played back in the near future. This allows content filter unit 750 to determine whether the subject matter constitutes objectionable content.

Data processing unit 720 (or perhaps a separate graphics component) is adapted for rendering on-screen menus or guide data. For instance, data processing unit 720 may be adapted to collect guide data and for storage of such guide data in local memory (not shown). When such data is requested, it is displayed and may even overlay video concurrently being displayed. Also, data processing unit 720 may be adapted to distort or blank out displayed images.

Figure 8A:
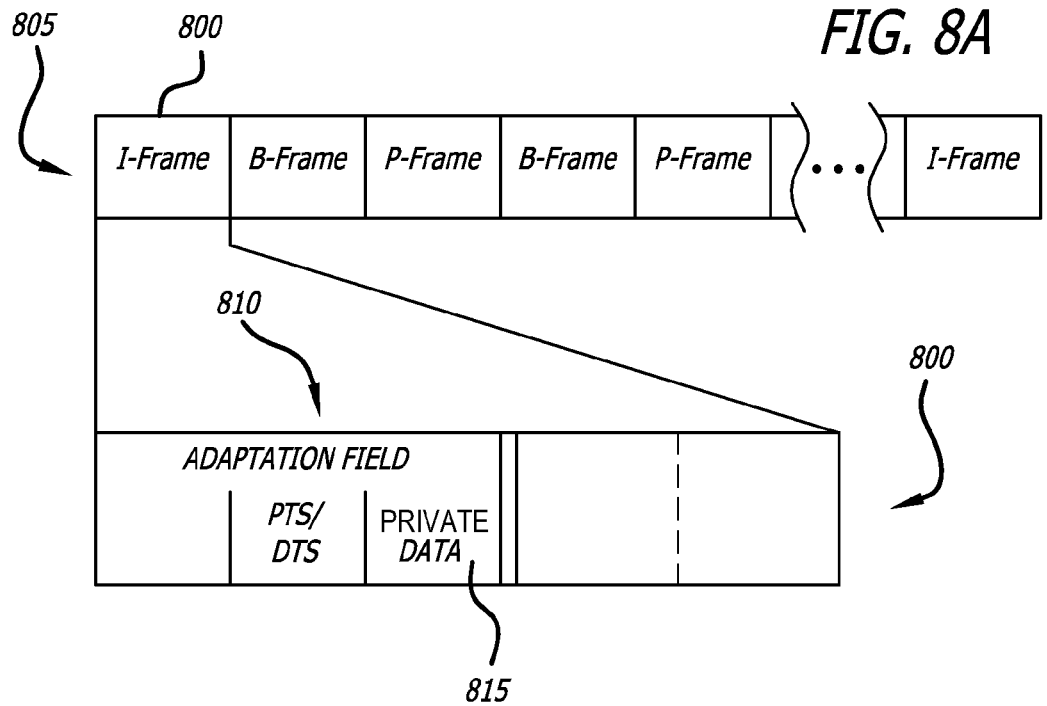
FIGS. 8A and 8B are exemplary diagrams of an Adaptation field of an I-frame, being a portion of a MPEG packet of the digital data stream.
Figure 8B:
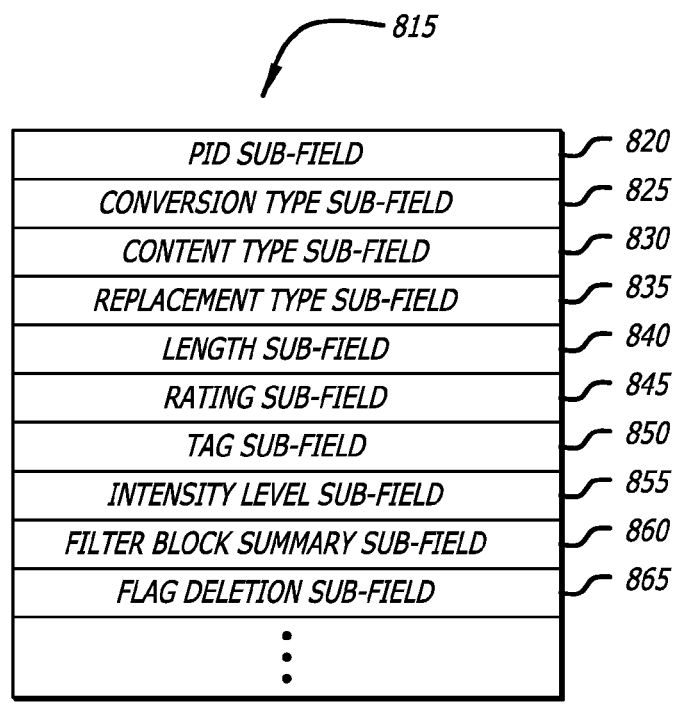

Referring to FIGS. 8A and 8B, exemplary diagrams of an Adaptation field 810 of an I-frame 800, being a portion of a MPEG packet 805 of the digital data stream is shown. Adaptation field 810 features control information 815 (also referred to as "private data") to initiate a filtering operation is shown. According to one embodiment of the invention, Adaptation field 810 includes control information 815 used by data processing unit 720 of FIG. 7 to (i) determine if content replacement is enabled or disabled and (ii) evaluate whether replacement content should be used. Such evaluation is conducted ahead of any scheduled rendering (playback for visual or audible perception) of scenes of digital content.

Adaptation field 810 includes control information 815 that features a plurality of sub-fields, including but not limited or restricted to one or more of the following: (1) PID sub-field 820, (2) Conversion type sub-field 825; (3) Content type sub-field 830; (4) Replacement type sub-field 835; (5) Length sub-field 840; (6) Rating sub-field 845; (7) Tag sub-field 850; (8) Intensity level sub-field 855; (9) Filter blocking summary sub-field 860 and (10) Flag deletion sub-field 865.

As illustrated in FIG. 5B, the PID sub-field 820 is adapted to identify what PIDs are provided for a scene started by I-frame 800. These PIDs may include a single (Primary) PID where no replacement content is available, and/or one or more secondary PIDs (e.g., PID-2, PID-3, etc.).

Conversion type sub-field 825 identifies whether the replacement content associated with a secondary PID is an up-rating (e.g., increasing the rating level and making the program for more mature audiences) or a down-rating (e.g., decreasing the rating level and making the displayed program for more general audiences).

Content type sub-field 830 identifies the type of content associated with I-frame 800 and the scene associated with I-frame 800. For instance, content type sub-field 830 may identify the content as a movie, a television series, a news clip, a live sporting event, a live entertainment event such as a concert, etc. This information is used to allow content filter unit 750 of FIG. 7 to filter a variety of types of content, especially those types of content that have not been subject to a ratings scheme.

Replacement type sub-field 835 identifies the type of replacement scheme available. For instance, the replacement scheme may involve full scene replacement or inter-scene data replacement (e.g., pixel obfuscation, audio muting, etc.) to reduce transmission bandwidth requirements. Alternatively, the replacement scheme may simply involve the insertion of content markers that are used by personal video recorders (PVRs) or other types of digital devices to adjust content playback during post-recording solutions.

Length sub-field 840 identifies the number of frames (I, B, P) associated with the length of the digital data stream forming the content.

Rating sub-field 845 provides an age or content rating associated with the scene that are used to determine if any modification, replacement or preclusion involving the rendering of a scene is required.

Tag sub-field 850 provided expanded filtering capabilities that enable filtering to be conducted based on specific types of content found in each scene and not the overall rating of the scene.

Intensity level sub-field 855 provides an alphanumeric value of the intensity of certain subject matter, such as levels of violence, sex or language for example, to provide greater granularity for the filtering operation. This granularity may avoid false-positives where some content may feature content that is in an objectionable category, but such inclusion is minimal or not graphic.

Filter blocking summary sub-field 860 provides for a contextual (tag) overrides described below.

Flag deletion sub-field 865 is a flag (or marker) used by PVR and perhaps other recording digital devices to remove blocking content.

III. Content Replacement Techniques

Figure 9:
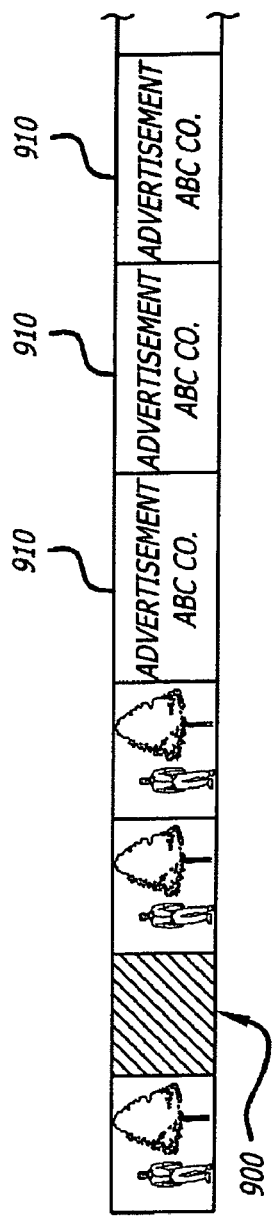
FIG. 9 is an exemplary diagram of a first embodiment of a content replacement process consistent with certain embodiments of the invention.

Referring to FIG. 9, an exemplary diagram of a first embodiment of a content replacement process consistent with certain embodiments of the invention is shown. For this embodiment, no replacement content is provided in the digital data stream, but control information is placed within the MPEG packets such as within the Adaptation field of the I-frame as described above. In response to detecting objectionable content, accomplished by comparing preset parental control parameters with information contained in rating, tag and/or intensity sub-fields 845-855 of FIG. 8B, the content filter unit causes a black frame 900 to be displayed in lieu of the objectionable content. Alternatively, in lieu of a black screen, a pre-stored banner 910, namely selected advertisements paid by various companies having a rating no greater than the limits (e.g., ratings, absence of certain subject matter, etc.) established for the parental control parameter(s) (hereinafter referred to as "parental control limits"), may be displayed if the blocking is for a longer duration.

Figure 10:
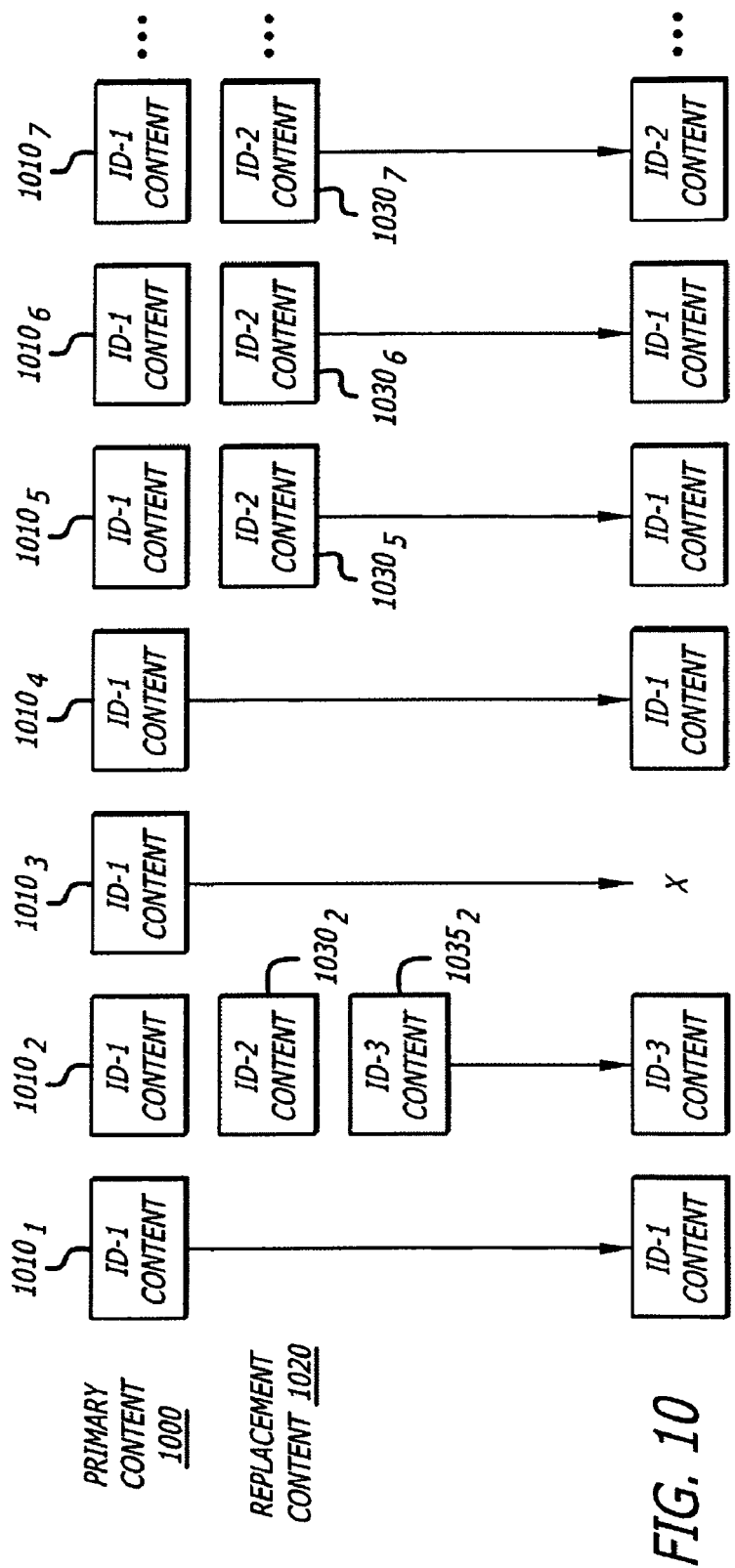
FIG. 10 is an exemplary diagram of a second embodiment of a content replacement process consistent with certain embodiments of the invention.

Referring now to FIG. 10, an exemplary diagram of a second embodiment of a content replacement process consistent with certain embodiments of the invention is shown. For this embodiment, primary content 1000 formed by a plurality of primary content segments $1010_1$-$1010_N$ (where $N \geq 1$), which are associated with corresponding primary identifiers (ID-1), such as a Packet Identifier (PID), and loaded into content filter unit 750 of FIG. 7. Replacement content 1020, namely replacement content segments $1030_2$, $1030_5$-$1030_7$ & $1035_2$ associated with certain secondary identifiers (e.g., ID-2, ID-3), is also provided to the content filter unit. Replacement content segments $1030_2$, $1030_5$-$1030_7$ & $1035_2$ may be lower rated or higher rated content than corresponding primary content segments $1010_2$ & $1010_5$-$1010_7$.

In response to detecting objectionable content in primary content segments $1010_2$ and $1010_7$, replacement content segments $1035_2$ and $1030_7$ are substituted for content segment $1010_2$ and $1010_7$, respectively. The collection of primary content segments and replacement content segments are output for viewing and/or listening by the end user. Upon evaluation of the primary content segment 1010₃, it is determined that this also includes objectionable content, but no replacement content segment is provided. As a result, screen blanking or audio muting is conducted as described in FIG. 7 as denoted by "X".

Figure 11:
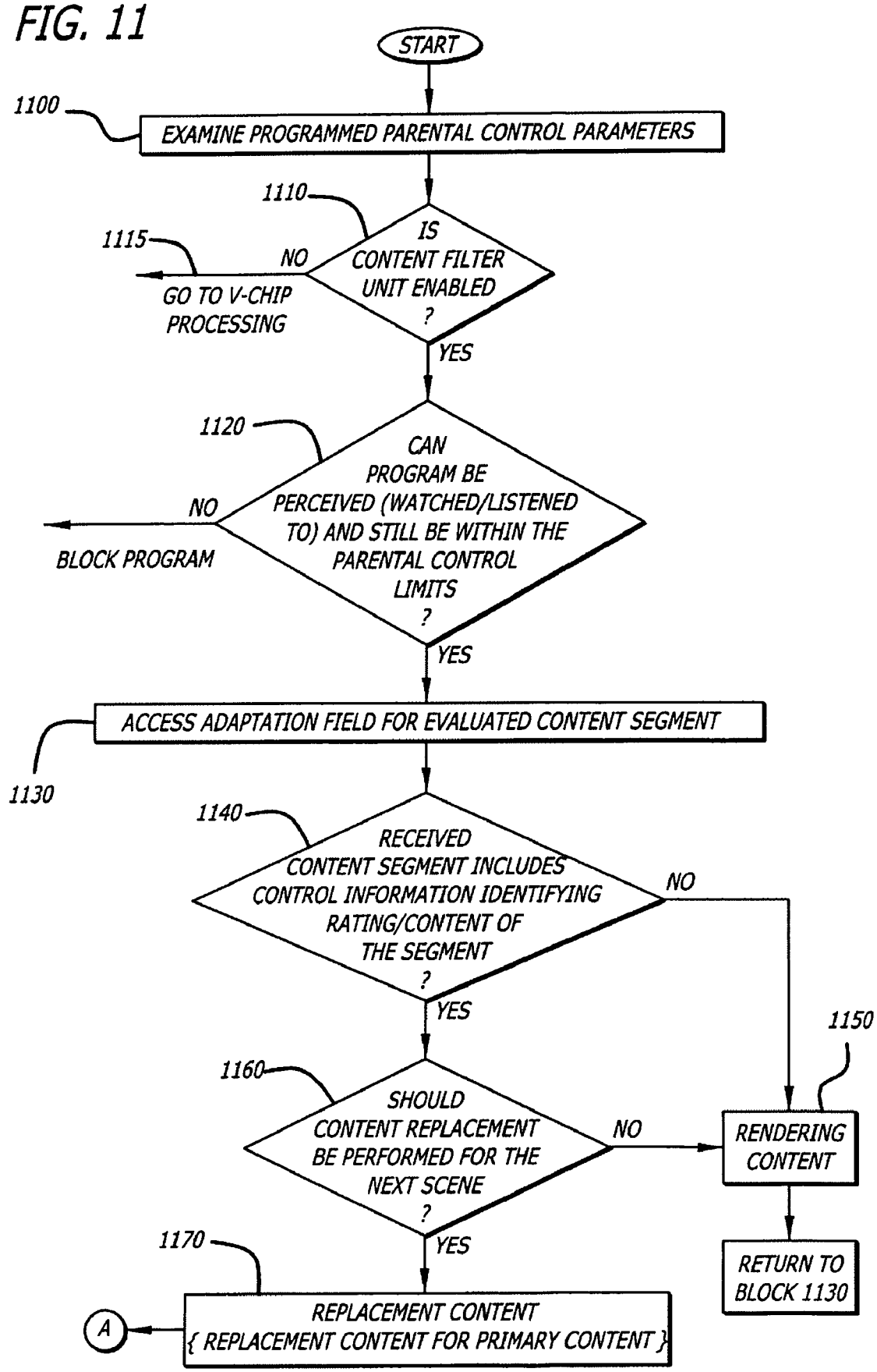
FIG. 11 is an illustrative flowchart of a process for determining whether a segment of content associated with a program should be prevented from being displayed.
Figure 13:
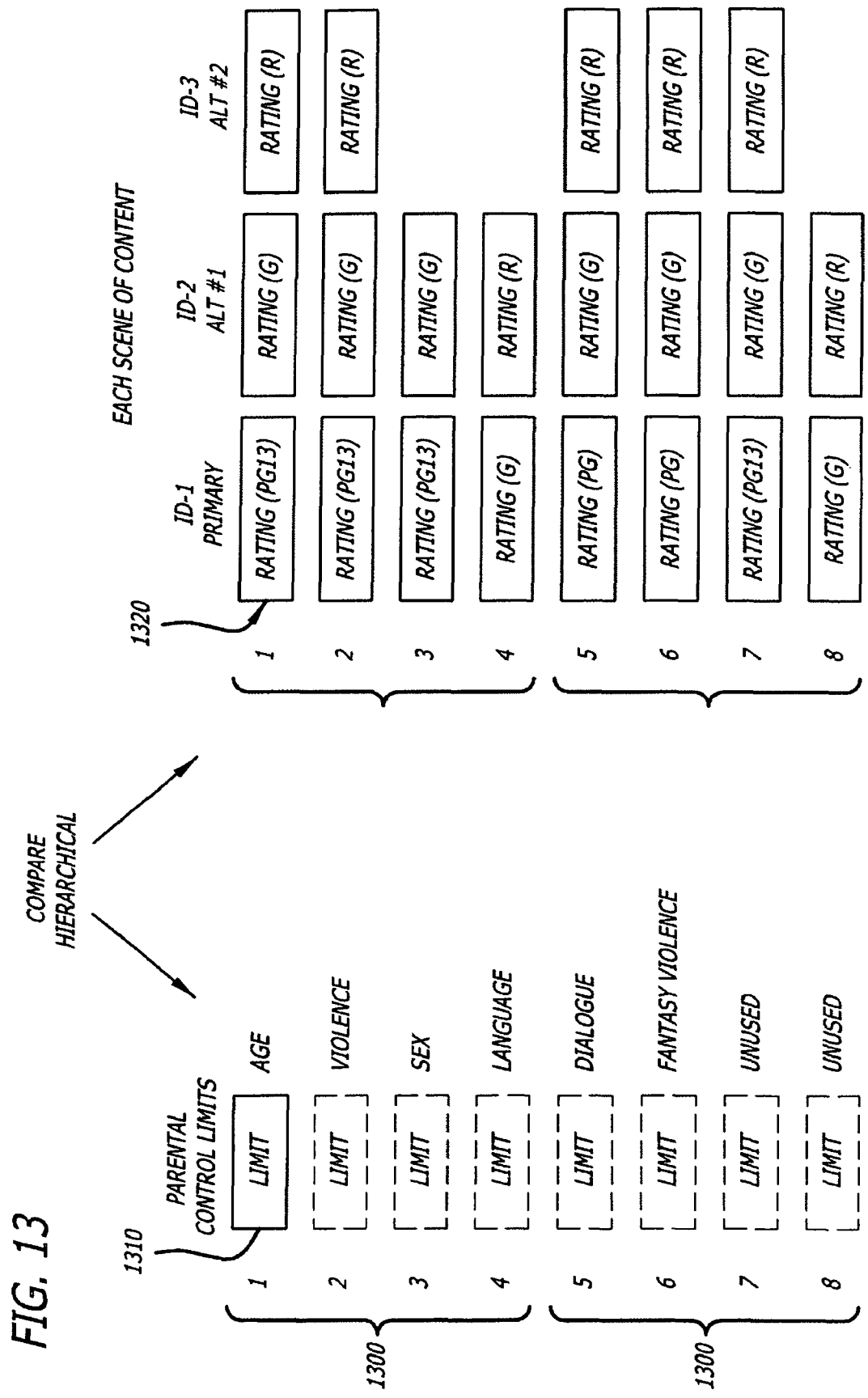
FIG. 13 is an exemplary embodiment of a Age-based Rating scheme for modification or substitution of scenes including objectionable content.
Figure 15A:
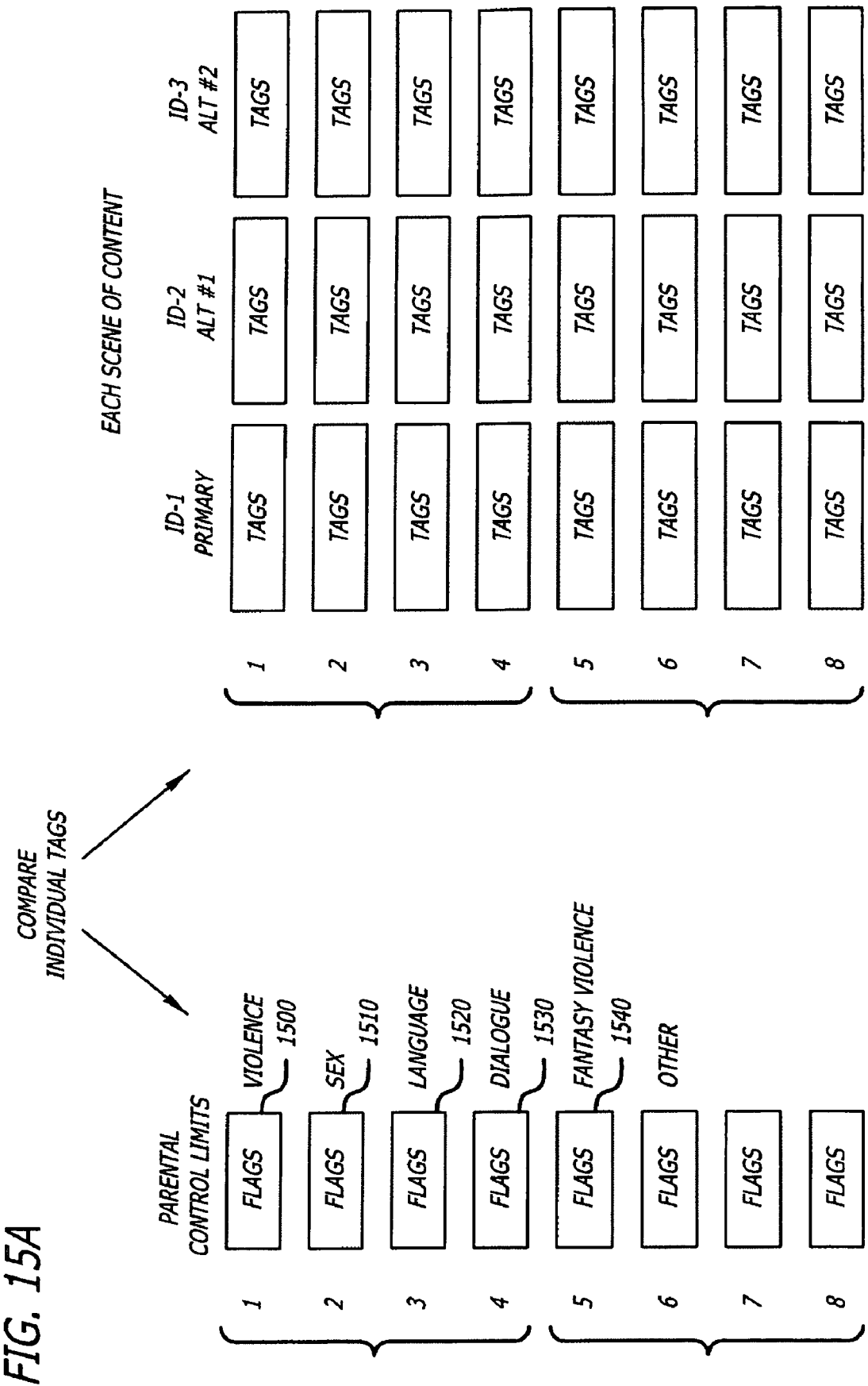
FIGS. 15A and 15B are exemplary embodiments of a Tag Rating scheme for modification or substitution of scenes including objectionable content.

Referring now to FIG. 11, an illustrative flowchart of a process for determining whether a segment of content associated with a program should be prevented from being displayed is shown. As illustrated, initially programmed parental control parameters are examined to determine what constitutes "objectionable content" for this content filter unit (block 1100). The parental control parameters are preset as shown in FIGS. 13, 14 and 15A.

Next, a determination is made whether the content filter unit has been enabled (block 1110). If not, the V-chip is used as an alternative source for regulating the content to be viewed (arrow 1115). If the content filter unit has been enabled, a first evaluation is whether the program being transmitted can be altered and maintained within the parental control limits set for the content filter unit (block 1120). This can be accomplished by analysis of a meta data regarding the content that summarizes the ratings (age or content based), content labels or content tags on a per scene or per program basis. As a result, replacement content having a lower rating (referred to as "down-rating") or having a higher rating may be substituted for the primary (chosen) content, provided such content still falls within the parental control limits (also referred to as "up-rating").

For each scene, a portion of the incoming content segment, such as the Adaptation field for example, is accessed to retrieve information therefrom (block 1130). A determination is made whether the received content segment includes control information to enable filtering of the content (block 1140). If not, the received content segment is rendered without filtering (block 1150). If the received content segment includes control information, a determination is made whether the primary content should be substituted for replacement content (blocks 1160 and 1170). The replacement scheme is set forth in FIG. 12.

Figure 12:
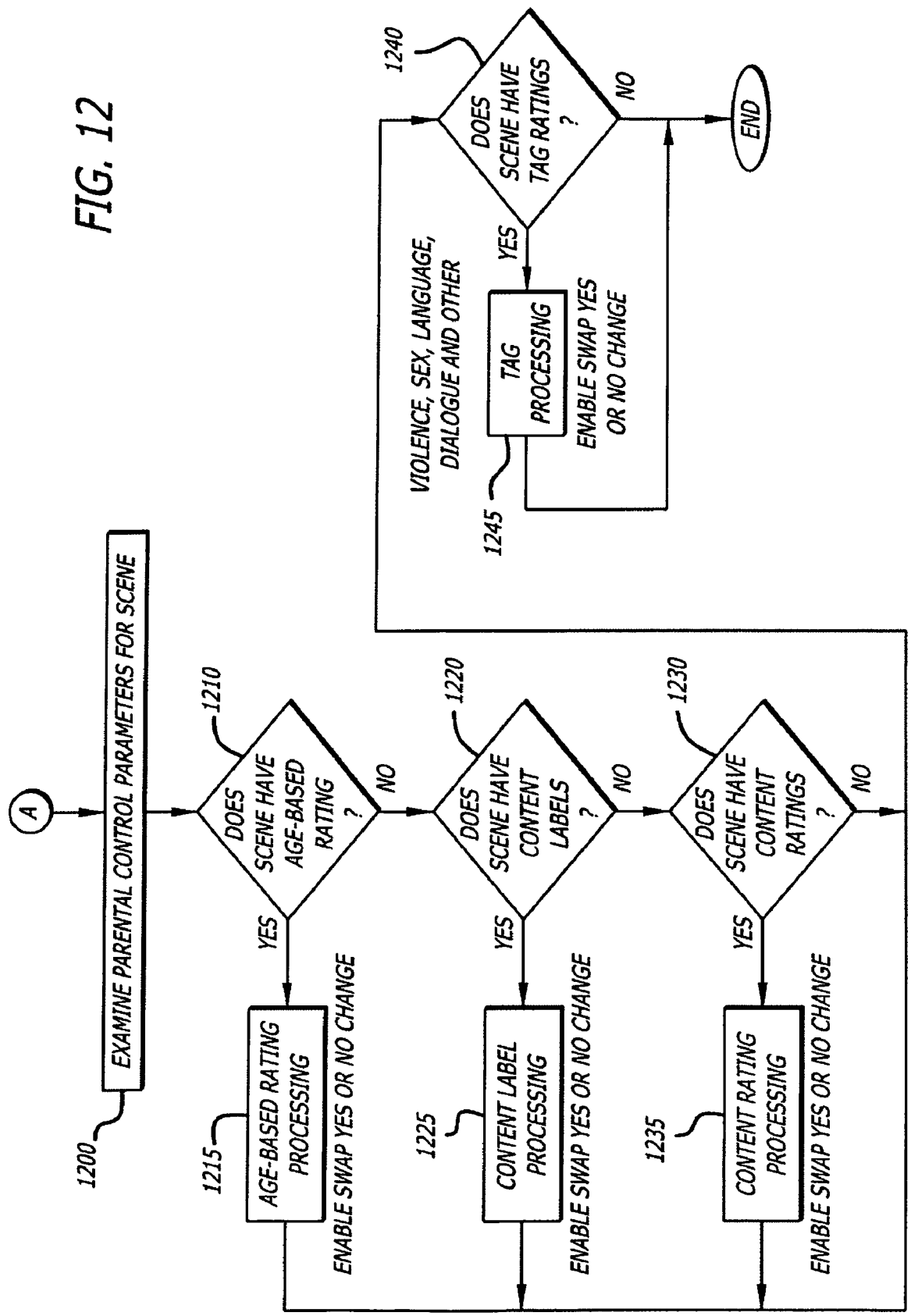
FIG. 12 is an illustrative flowchart of a process for substituting replacement segments of content based on parental control parameters.

FIG. 12 provides an illustrative flowchart of a process for substituting replacement content based on parental control parameters. Initially, as shown in block 1200, parental control parameters associated with the scene are examined. Next, a determination is made whether the display of the scene is controlled based on an Age Rating (block 1210). If so, Age-based rating processing is conducted where the Age Rating of the scene is compared to Aged-based parental control limits programmed by the end user and monitored by the content filter unit (block 1215). In the event that the Age Rating of the scene exceeds the Aged-based parental control limits, the scene is not rendered, but instead may be down-rated through substitution of replacement content or blocked. This substitution may be regulated through use of the synchronization marks described above.

As an option, the content filter unit can be programmed to substitute replacement content having a higher rating than the primary content. The higher rated content would be displayed if the following conditions are met: (1) replacement content has a higher rating than the primary content, and (3) the Age Rating of the replacement content does not exceed the Aged-based parental control limits.

For instance, as shown in FIG. 13, an exemplary ratings table 1300 for objectionable content is shown. Herein, the content filter unit is programmed by setting an Age-based parental control limit within a first parental control parameter 1310. As an example, the Age Rating is established to cover age-based rating levels G, PG, PG-13, R and NC-17 ratings used in movies as well as rating levels TV-Y, TV-Y7, TV-Y7-FV, TV-G, TV-14 and TV-MA used in television broadcasts. For instance, TV-14 may have the same Age rating level as PG-13 (V,S), where "V" denotes violence and "S" denotes sexual content.

As an illustrative example, a first scene 1320 of a program may feature PG-13 content as identified by a primary identifier (ID-1), and thus, no substitution is conducted if the Aged-based parental control limit is set to "PG-13". However, if the Aged-based parental control limit is set to allow only "G" (or lesser rated) movies or related television broadcasting (e.g. TV-G), replacement content associated with a first alternative identifier (ID-2) would be rendered for the first scene. However, if no age threshold was set, the "R" version of the scene would be rendered by substitution of the "PG-13" content associated with ID-1 with "R" scene content associated with a second alternative identifier (ID-3). The same operations would occur for each scene.

As a result, for "PG-13" Aged-based parental control limits set within first parental control parameter 1310, content segments for scenes 1-8 associated with ID-1 would be rendered. For "G" Aged-based limits set within first parental control parameter 1310, content segments associated with ID-1 (scenes 4 and 8) and ID-2 (scenes 1-3 & 5-7) would be shown. Where no Aged-based limits are established and the content filter unit is programmed to increase the rating of the content where possible, content associated with ID-1 (scene 3), ID-2 (scene 8) and ID-3 (scenes 1-2 & 4-7) would be shown.

Referring back to FIG. 12, another determination is whether the display of the scene is controlled based on content label scheme (blocks 1220 and 1225). With respect to content label evaluation scheme, a determination is made if any particular category of content is present. This is similar to Content Rating scheme describe below where the "Intensity" parental control limits are set to "0", which also indicates that if there is any content with this subject matter, replacement content without such subject matter (and within the limits set for other types of subject matter) is selected. If no replacement content is available, the content is blocked or muted.

Yet another determination is whether the display of the scene is controlled based on content rating scheme (block 1230). If so, an Intensity rating is applied to a variety of subject matter categories that parents may find objectionable for their children (block 1235). For instance, these categories may be broadly defined such as violence, sex, language, and the like. For those content segments that include this subject matter, "Intensity" values are assigned for each scene based on the maturity level of the subject matter.

As an illustrative example, as shown in FIG. 14, if a first scene 1400 for primary content 1410 of a program includes a fist fight along with a curse word, the violence rating may be set to a first prescribed value, which will likely be fairly low (e.g., 2 out of 15). Depending on the curse word spoken and the audible nature of the curse word, the language rating may be set to a second prescribed value (e.g., 6 out of 15). Replacement content 1412 is provided and associated with ID-2, it may include the elimination of the fist flight and merely a shouting match without any curse words. This replacement content may be substituted if the violence parental control parameters for violence and language are less than "2" and "6", respectively. Otherwise, the primary content is shown since these Intensity values are less than or equal to the parental control limits of "6", "7" and "3" for violence, language and sex parental control parameters 1420, 1422 and 1424.

Of course, as an alternative, there may be replacement content 1414 where the fist fight is substituted with a knife fight as originally intended by the director for this program. This replacement content would have a higher violence rating (e.g., 6 out of 15). Since the parental control limits for violence were set at "6", replacement content associated with ID-3 would be shown if up-rating of the content is desired.

For these parent control limits, if no up-rating is desired, scenes 1, 5-6 and 8 would render content associated with ID-1 (primary ID) and scenes 2-4 and 7 would render content associated with ID-2. With respect to scenes 5 and 7, since no up-rating is desired, the primary content is normally retained as a default, providing scenes 5 and 7 fall within the parental control limits selected. However, it is contemplated that the default setting can be configured to select the content segment having a rating closest to the parental control limits.

In the event that up-rating of content has been selected, scenes 2 and 8 would render content associated with ID-1 (primary ID), scenes 3-6 would render content associated with ID-2 (first alternative ID) and scenes 1 and 7 would render content associated with PID-3 (second alternative ID).

Figure 15B:
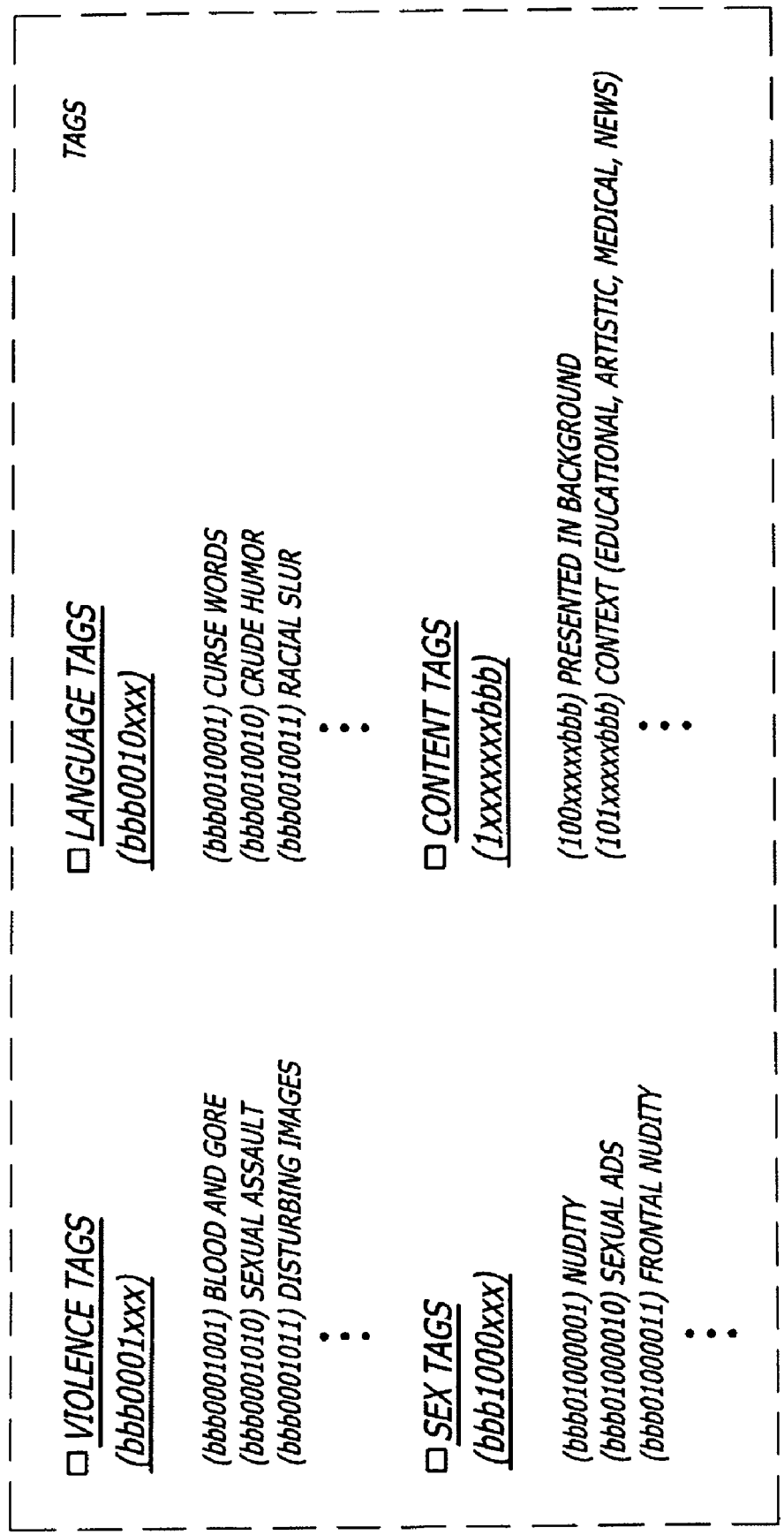

Referring back to FIG. 12, another determination is whether the display of the scene is controlled based on a tag rating scheme (blocks 1240 and 1245). As shown in FIGS. 15A and 15B, the "tag rating" scheme provides a substantial granularity as to what specific content may be excluded. According to one embodiment, each category 1500-1540 and sub-category is uniquely assigned a unique bit pattern so that a multi-byte tag value associated with each scene may be used to identify multiple categories where potential objectionable content may be found. Hence, specific renderings of violence, language, sex, etc. may be prevented.

As an optional configuration, each category may be assigned a particular bit and sub-categories are identified by bit combinations inclusive of the bit assigned to the category. As an example, as shown in FIG. 15B, a tag table may be created where a fourth least significant bit (bbb00001xxx) of a double word tag (4-bytes, where "b" denotes byte) is set when the scene involves violence. For the violence categories, a number of subcategories may be used to denote blood and gore (bbb00001001); sexual assault (bbb00001010), disturbing images (bbb00001011), etc.

Hence, for each scene, the tag is extracted and processed, such as conducting Exclusive OR'ed with the parent control parameter tags set by the user, in order to determine if any objectionable content is found in the scene. If not, the original content may be displayed. Otherwise, if objectionable content is found, a determination is made whether the replacement content features the objectionable content. If not, the replacement content is displayed. Otherwise, if down-rating is needed, no override is indicated, and no replacement content is available, the primary content is blocked or muted.

Upon determining that the scene includes objectionable content, as an optional feature, a determination may be conducted to understand the context that the objectionable content is featured.

For instance, as an illustrative example, certain nudity may be prevalent for a medical procedure featured in the program. Therefore, if the program is a documentary on medical procedures, various bits reserved in the parental control parameters or separate context identifiers coupled be selected as illustrated in FIG. 15B. Hence, certain sub-categories of sex tags may be ignored. Similarly, a gun fight may be prevalent in a documentary regarding the Wild West so any violence tags below a predetermined rating (e.g., rating "6") would be ignored. Hence, the context parameter can be used to override the content segment replacement operations described above.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A nonlinear editing system comprising:
   a video encoder to receive a first video stream including video originally intended as video for a scene of a program and a second video stream including a first alternate video for replacing the video, the video encoder inserting video synchronization marks into the video and the first alternate video;
   an audio compressor to receive a first audio stream including audio originally intended as audio for the scene of the program and a second audio stream including a first alternate audio for replacing the audio, the audio compressor inserting audio synchronization marks into the audio and the first alternate audio, wherein the video and audio synchronization marks, respectively, include a primary clock reference, decoding time stamp, and presentation time stamp; and
   an engine unit to synchronize the video with the first alternate video using the video synchronization marks and to synchronize the audio with the first alternate audio using the audio synchronization marks so that, where the scene of the program includes objectionable content, (i) the video is substituted with the first alternate video, (ii) the audio is substituted with the first alternate audio, or (iii) both the video and the audio are substituted with the first alternate video and the first alternate audio.

2. The nonlinear editing system of claim 1, wherein the video encoder includes a first video encoder to process the first video stream and a second video encoder to process the second video stream.

3. The nonlinear editing system of claim 1, wherein the second video stream includes a blank screen video between the first alternate video and a second alternate video.

4. The nonlinear editing system of claim 3, wherein the second audio stream includes muted audio between the first alternate audio and a second alternate audio.

5. The nonlinear editing system of claim 4, wherein the engine unit trims the blank screen video from the second video stream and the muted audio from the second audio stream.

6. The nonlinear editing system of claim 5, wherein the engine unit insert a reminder of the second video stream after trimming of the blank screen video to be multiplexed into a primary transport stream including the video and the audio.

7. The nonlinear editing system of claim 6, wherein the engine unit insert a reminder of the second audio stream after trimming of the muted audio to be multiplexed into the primary transport stream.

8. A nonlinear editing system comprising:
   a video encoder to receive a first video stream including video originally intended as video for a scene of a program and a second video stream including a first alternate video for replacing at least a portion of the video, the video encoder inserting video synchronization marks into the video and the first alternate video;
   an audio compressor to receive a first audio stream including audio originally intended as audio for the scene of the program and a second audio stream including a first alternate audio for replacing at least a portion of the audio, the audio compressor inserting audio synchronization marks into the audio and the first alternate audio, wherein the video and audio synchronization marks, respectively, include a primary clock reference, decoding time stamp, and presentation time stamp; and an engine unit to determine if the scene of the program includes objectionable content and to substitute main content, being at least one of the video and the audio, with replacement content using at least one of the audio and video synchronization marks if the scene of the program includes objectionable content and the replacement does not feature the objectionable content.

9. The nonlinear editing system of claim 8, wherein the replacement content includes the alternate video.

10. The nonlinear editing system of claim 8, wherein the replacement content includes the alternate audio.

11. The nonlinear editing system of claim 8, wherein the replacement content is one of an ad banner and distorted display images.

12. The nonlinear editing system of claim 8, wherein the engine unit determining if the scene of the program features objectionable content by accessing information provided with main content including the video and the audio and comparing the information with prior established parental control limits.

13. The nonlinear editing system of claim 12, wherein the engine unit accessing information provided with the main content and comparing the information with prior established parental control limits by determining whether an Age-based rating assigned to the scene of the program associated with the main content exceeds an Age-based parental control limit being the prior established parental control limit and to substitute the main content with the replacement content if (i) the Age-based rating of the scene associated with the main content exceeds the Age-based parental control limit and (ii) an Age-based rating of the replacement content is less than or equal to the Age-based parental control limit.

14. The nonlinear editing system of claim 12, wherein the engine unit comparing of the information by analyzing tag information provided with the main content for the scene, determining by analysis of the tag information if the main content includes content identified as objectionable, and substituting the main content with the replacement content if the main content includes objectionable content as identified by the tag information and the replacement content does not include the objectionable content.

15. A machine readable non-transitory medium to tangibly store software that, if executed by an engine unit, will cause a non-linear editing system to perform the following operations:

receiving a first video stream including video originally intended for a scene of a program and a second video stream including a first alternate video for replacing the video, the video and the first alternate video including video synchronization marks;

receiving a first audio stream including audio originally intended for the scene of the program and a second audio stream including a first alternate audio for replacing the audio, the audio and the first alternate audio including audio synchronization marks, wherein the video and audio synchronization marks, respectively, include a primary clock reference, decoding time stamp, and presentation time stamp; and synchronizing the video with the first alternate video using the video synchronization marks and synchronizing the audio with the first alternate audio using the audio synchronization marks so that, where the scene of the program includes objectionable content, (i) the video is substituted with the first alternate video, (ii) the audio is substituted with the first alternate audio, or (iii) both the video and the audio are substituted with the first alternate video and the first alternate audio.

16. The machine readable non-transitory medium of claim 15, wherein the synchronizing performed by the software includes trimming blank screen video from the second video stream and muted audio from the second audio stream.

17. The machine readable non-transitory medium of claim 16, wherein the synchronizing performed by the software further includes inserting a reminder of the second video stream after trimming of the blank screen video to be multiplexed into a primary transport stream including the video and the audio.

18. The machine readable non-transitory medium of claim 17, wherein the synchronizing performed by the software further includes inserting a reminder of the second audio stream after trimming of the muted audio to be multiplexed into the primary transport stream.

* * * * *